United States Patent [19]
Kass et al.

[11] Patent Number: 5,115,411
[45] Date of Patent: May 19, 1992

[54] DUAL PORT MEMORY SYSTEM

[75] Inventors: William J. Kass, Easley; Michael R. Hilley, Belton, both of S.C.

[73] Assignee: NCR Corporation, Dayton, Ohio

[21] Appl. No.: 534,081

[22] Filed: Jun. 6, 1990

[51] Int. Cl.$^5$ .................... G11C 7/00; G11C 11/407; G11C 11/409
[52] U.S. Cl. .................... 365/189.01; 365/230.05; 365/189.04; 365/189.02
[58] Field of Search .......... 365/189.04, 238.5, 230.02, 365/230.05, 230.08, 189.05, 189.02

[56] References Cited

U.S. PATENT DOCUMENTS

| | | | |
|---|---|---|---|
| 4,212,057 | 7/1980 | Devlin et al. | 364/200 |
| 4,309,754 | 1/1982 | Dinwiddle, Jr. | 364/200 |
| 4,371,932 | 2/1983 | Dinwiddle, Jr. et al. | 364/200 |
| 4,604,683 | 8/1986 | Russ et al. | 364/200 |
| 4,656,614 | 4/1987 | Suzuki | 365/189.04 |
| 4,796,232 | 1/1989 | House | 364/900 |
| 4,815,038 | 3/1987 | Scharrer et al. | 365/230.05 X |
| 4,833,649 | 5/1989 | Greub | 365/230.05 X |
| 4,868,784 | 9/1989 | Marshall et al. | 364/900 |
| 4,888,741 | 12/1989 | Malinowski | 365/230.05 |
| 4,893,279 | 1/1990 | Rahman et al. | 365/189.04 X |
| 4,933,909 | 6/1990 | Cushing et al. | 365/230.05 |
| 4,937,781 | 6/1990 | Lee et al. | 365/230.05 |
| 4,967,398 | 10/1990 | Jamoua et al. | 365/230.05 |

*Primary Examiner*—Alyssa H. Bowler
*Attorney, Agent, or Firm*—Douglas S. Foote

[57] ABSTRACT

A system comprising a memory for transferring m data bytes at a time, first and second busses each having a width of less than m data bytes, first parallel m byte wide read and write registers connected between the first bus and the memory and second parallel m byte wide read and write registers connected between the second bus and the memory.

13 Claims, 23 Drawing Sheets

DUAL PORT MEMORY SYSTEM

The present invention relates generally to a data processing system having a common memory accessible from two ports. More particularly, it relates to the data path structure between the ports and the common memory.

BACKGROUND OF THE INVENTION

Two important elements in a computer system are the processor and the memory. The processor operates on data stored in the memory and generally controls the transfer of data into and out of the memory. Other elements of the computer system may also require access to the memory. In order to avoid conflicts such as overlapping requests for memory access, the processor typically controls access to the memory by arbitrating between the various requests.

As the computer system becomes more complex, an increasing number of elements require access to the memory. For example, multiple processors and control units in a computer system require individual access to the memory. Although multiple processors and control units can provide increased efficiency, speed and functionality, they also crate a memory access bottleneck. This can result in more wait states for each element which can deteriorate system performance.

Another factor contributing to memory access delays is related to the use of the data bus interconnecting the various elements and the memory. The data bus is used for data transfers between the various elements as well as for memory access. Since simultaneous use of the bus is not permitted, an element may have to wait for access to the bus as well as having to wait for access to the memory. In other words, if all the elements of a system are connected to the same bus there is competition not only to access the memory but also to have access to the bus.

In order to reduce the bus contention problems, multiple busses with fewer elements connected to each bus may be employed. This will reduce bus contention problems and allow different bus activities to occur simultaneously without mutual interference. However, if a single memory is to be maintained, access to the memory still involves delays.

A dual port memory design allows access of a single memory from two busses. A typical dual port memory design is shown in U.S. Pat. No. 4,796,232. The '232 design provides access to a multiple bank, DRAM memory through two ports. A logic circuit arbitrates between read/write requests from the ports and DRAM refresh requests. The logic circuit allows one memory bank to be refreshed while another bank is accessed by a read or write to a port. The '232 design also uses a data register between each bus and the memory banks. A data register will accept, for example, a data element written from a bus thereby freeing that bus for other activity. However, subsequent data elements can not be written from that bus until the data element in the register is written into memory. The transfer of the data element from the register into memory may involve some delays because it must compete with transfer requests from the other bus and with refresh requests.

OBJECTS OF THE INVENTION

It is therefore an object of the present invention to provide a new and improved dual port memory system.

It is another object of the present invention to provide an improved data path structure for a dual port memory system.

It is a further object of the present invention to provide a dual port memory system with fewer delays for the transfer of data between each port and the memory.

It is yet another object of the present invention to provide a dual port memory which improves system performance.

SUMMARY OF THE INVENTION

The present invention is a dual port memory system comprising a memory, first and second data busses, a set of first write registers and a set of first read registers connected in parallel between the first bus and memory, and a set of second write registers and a set of second read registers connected in parallel between the second bus and memory. The memory stores m data bytes at each addressable location therein. The width of the first bus is n bytes, where $n<m$, and the width of the second bus is p bytes, where $p<m$. The registers within each set are connected in parallel and the width of each set of registers is m bytes.

DESCRIPTION OF A PREFERRED EMBODIMENT

Figure 1:
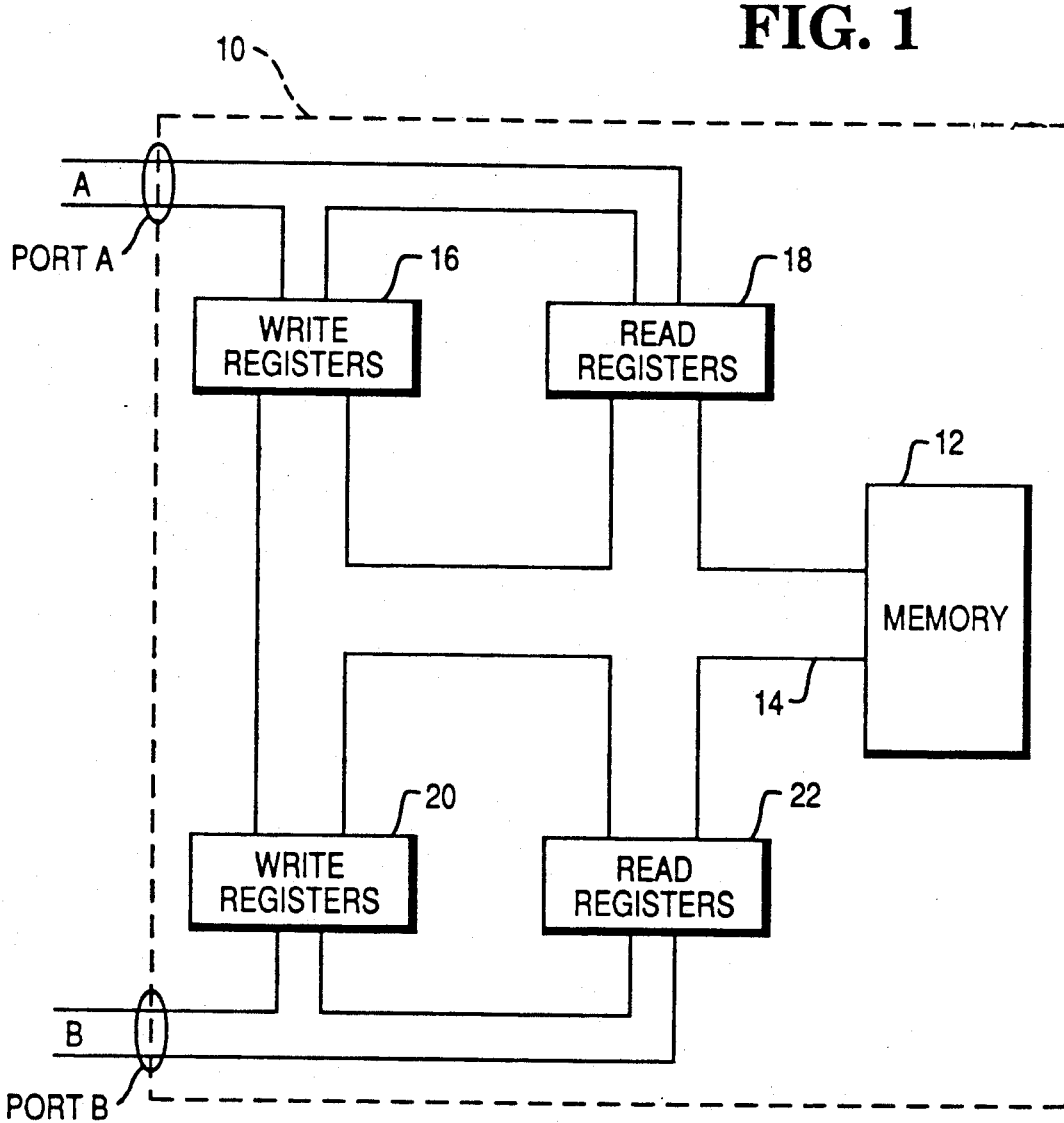
FIG. 1 is a data path block diagram of a dual port memory system according to one form of the present invention.

FIG. 1 shows a schematic data path diagram of a dual port memory system 10 according to the present invention, the structure and operation of which will first be briefly described. System 10 includes a single ported memory 12 which will typically consist of a number of DRAM memory chips. Data bytes are transferred into and out of memory 12 over data bus 14. Bus 14 has a multiple byte width, meaning that a plurality of data bytes may be simultaneously transferred into and out of memory 12. In the embodiment described in FIG. 3, bus 14 is sixteen bytes wide. Thus, for eight bit data bytes, 128 bits of data may be written into or read from memory 12 in a single memory access. Memory 12 is accessible from two independent busses A and B. Each bus A and B has a width less than that of bus 14. In the FIG. 3 embodiment, the width of each bus A and B is four bytes. For best performance, the width of each bus A and B is an integer factor of the width of bus 14. However, there is no requirement that the width of bus A and B be the same. Memory 12 is connected to bus A through write registers 16 and read registers 18, and is connected to bus B through write registers 20 and read registers 22. Write registers 16 and read registers 18 are connected in parallel and are used respectively for writes to and reads from memory 12. Similarly, write registers 20 and read registers 22 are connected in parallel and are used respectively for writes to and reads from memory 12. Each of the registers 16, 18, 20 and 22 have the same number of byte wide data registers as the byte width of bus 14. For example, if bus 14 has a width of sixteen bytes, write register 16 will have sixteen parallel registers connected to respective byte lines in bus 14.

In operation, data transfers between bus A and registers 16 and 18 may occur simultaneously with data transfers between bus B and registers 20 and 22. For example, assume bus 14 has a width of 16 bytes and busses A and B each have a width of four bytes. Further assume consecutive data bytes are to be written into memory 12 from bus A, at the same a memory read request from bus B is received. Four consecutive writes of four bytes each from bus A to write registers 16 may immediately occur before access to memory 12 is required. At the same time, read registers 22 may be filled with sixteen bytes of data by a single read access to memory 12. If all sixteen data bytes in read registers 22 are requested, four consecutive reads of four bytes each from registers 22 can now occur before access to memory 12 is again required by bus B. During the reading of registers 22, the data in registers 16 may be written into memory 12, and, in addition, other accesses to memory 12 such as a refresh operation may take place. In this manner, the transfer of data into and out of memory 12 is highly efficient with minimum delays for reads or writes from either bus. The above described scenario assumes that the four consecutive writes to registers 16 and the four consecutive reads from registers 22 each contain adjacent data bytes for a common sixteen byte address in memory 12. However, even if the bytes are not all to the same address, improved efficiency is achieved.

Figure 2:
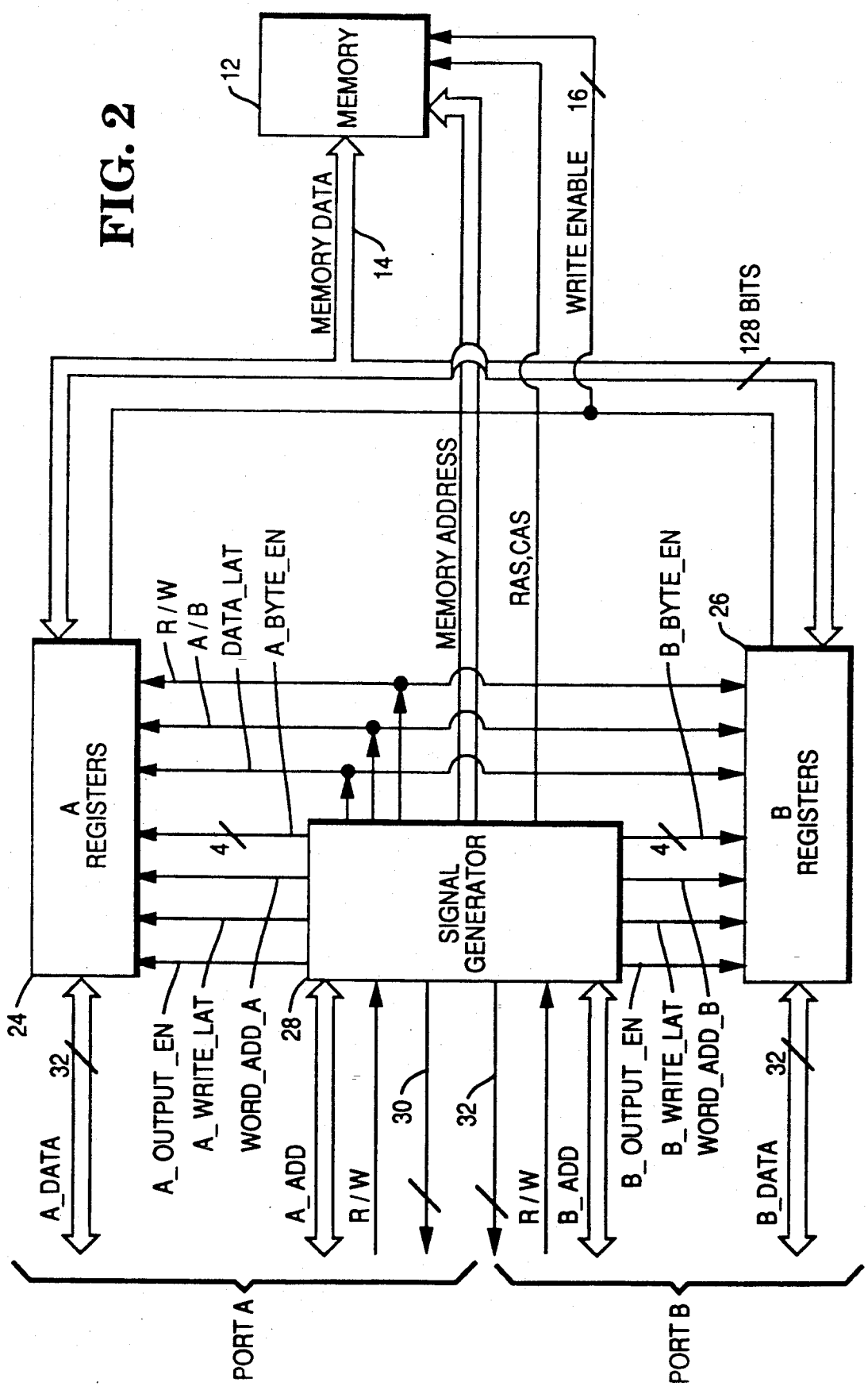
FIG. 2 is a signal path diagram for the dual port memory system of FIG. 1.

Referring now to FIG. 2, a signal flow path diagram is shown. Data bus A is connected through port A to the A registers block 24 which contains write registers 16 and read registers 18 shown in FIG. 1. Data bus B is connected through port B to the B registers block 26 which contains write registers 20 and read registers 22 shown in FIG. 1. A signal generator 28 receives address signals A_ADD associated with bus A and address signals B_ADD associated with bus B. In addition, signal generator 28 receives a read/write signal R/W associated with each of busses A and B, and provides acknowledge and ready signals over each bus 30 and 32.

Signal generator 28 provides MEMORY ADDRESS and RAS and CAS signals to memory 12, A_OUTPUT_EN, A_WRITE_LAT, WORD_ADD_A and A_BYTE_EN signals to A registers 24, B_OUTPUT_EN, B_WRITE_LAT, WORD_ADD_B and B_BYTE_EN signals to B registers 26, and DATA_LAT, A/B and R/W signals to both A registers 24 and B registers 26. The generation of MEMORY ADDRESS and RAS and CAS signals is well known and may be done in a conventional manner. Generator 28 arbitrates between memory access requests from bus A and bus B and may also arbitrate memory refresh operations. The various signals provided to A registers 24 and B registers 26 may also be generated in a conventional manner. Their routing and operation will be described with respect to FIGS. 3A14 3U.

Figures 3, 3A:
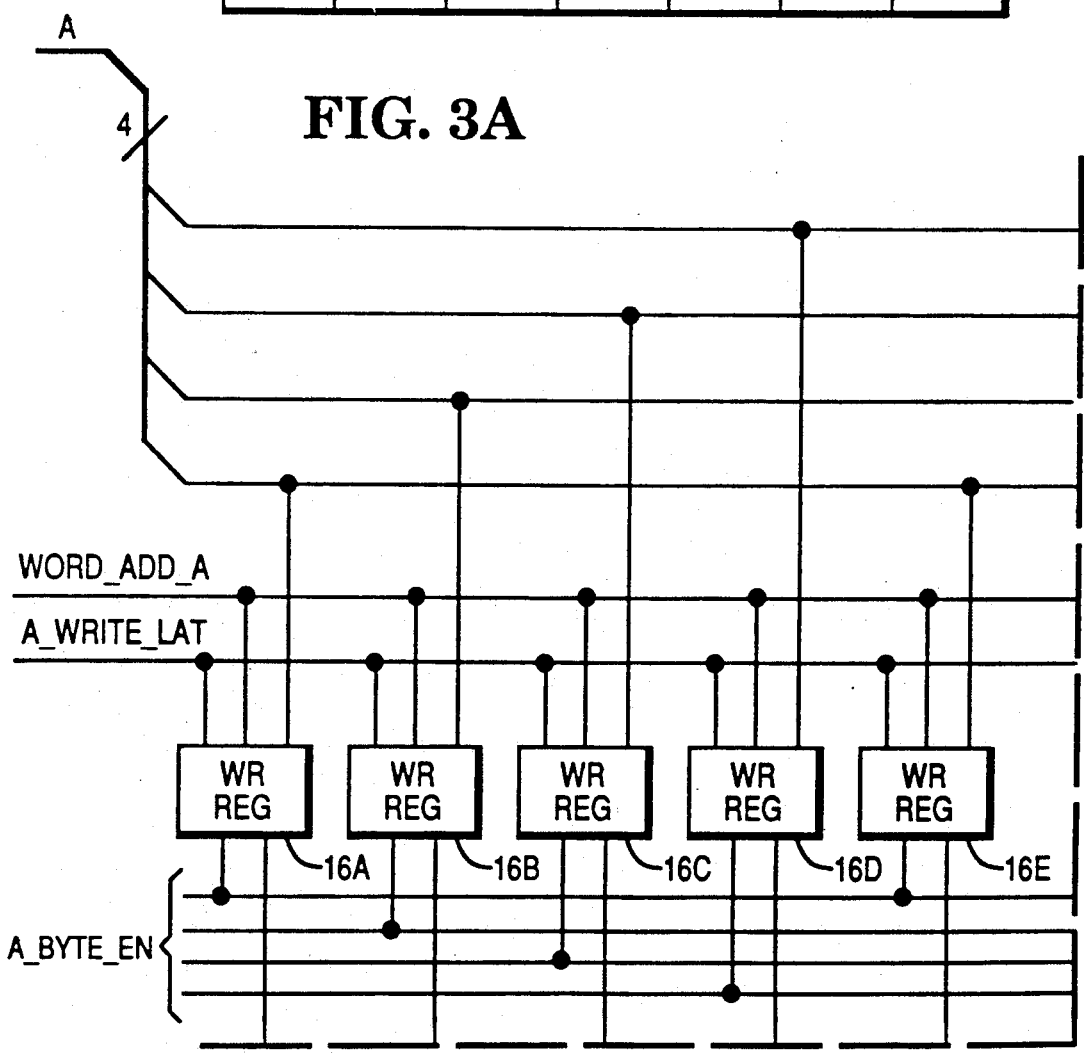
FIGS. 3A-3U show a diagram of the data registers of FIG. 1.
Figure 3B:
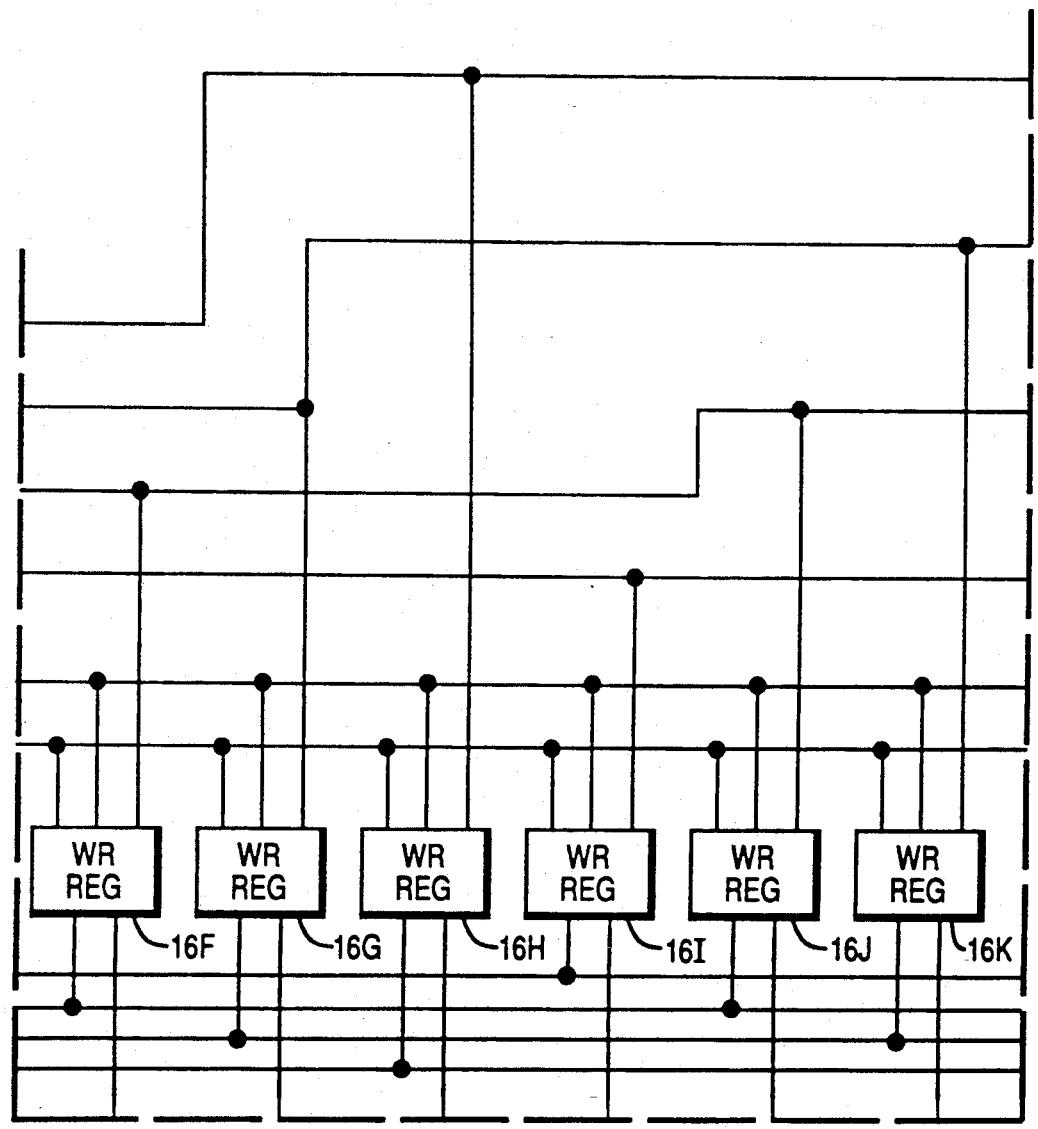
Figure 3C:
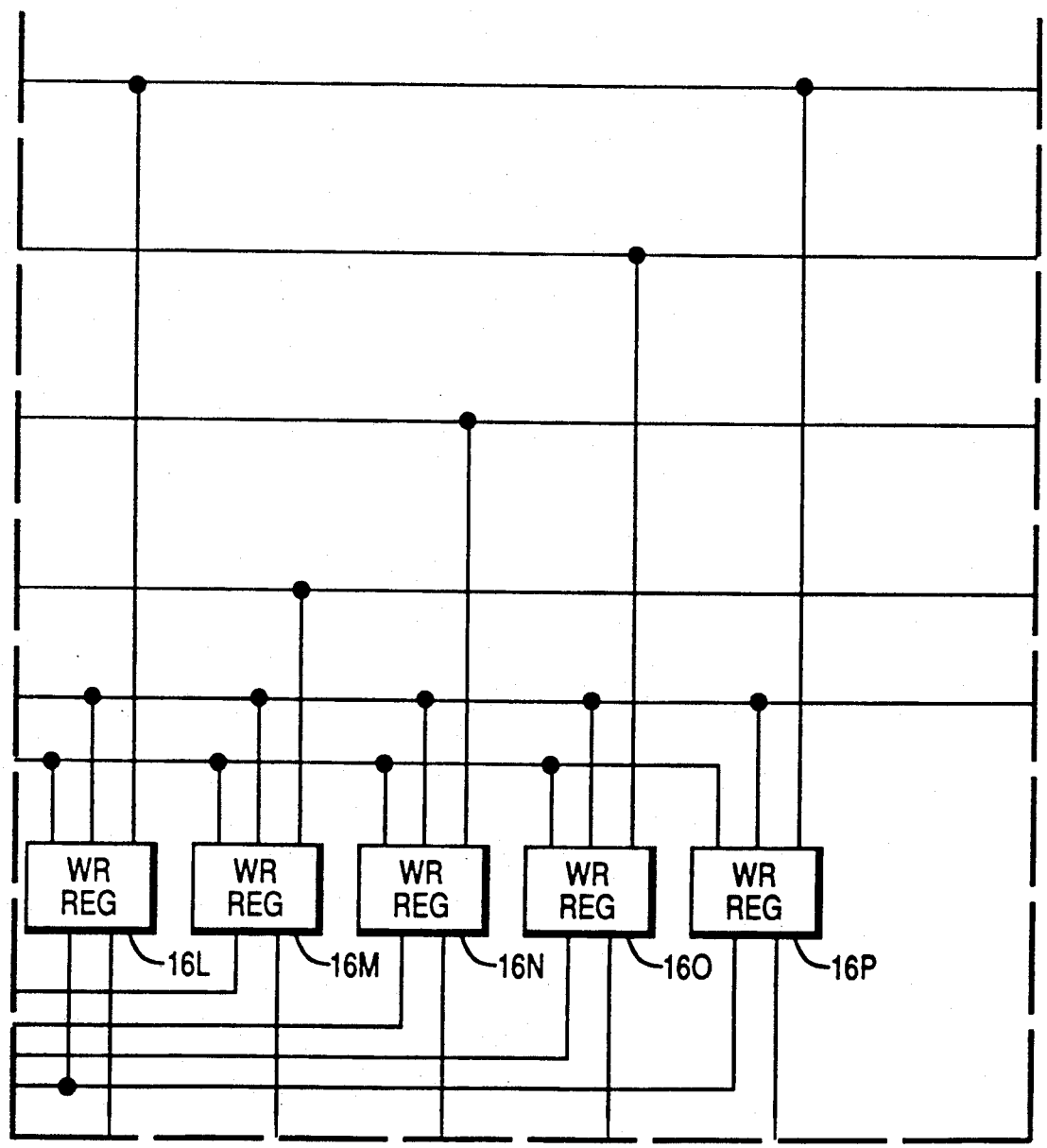
Figure 3D:
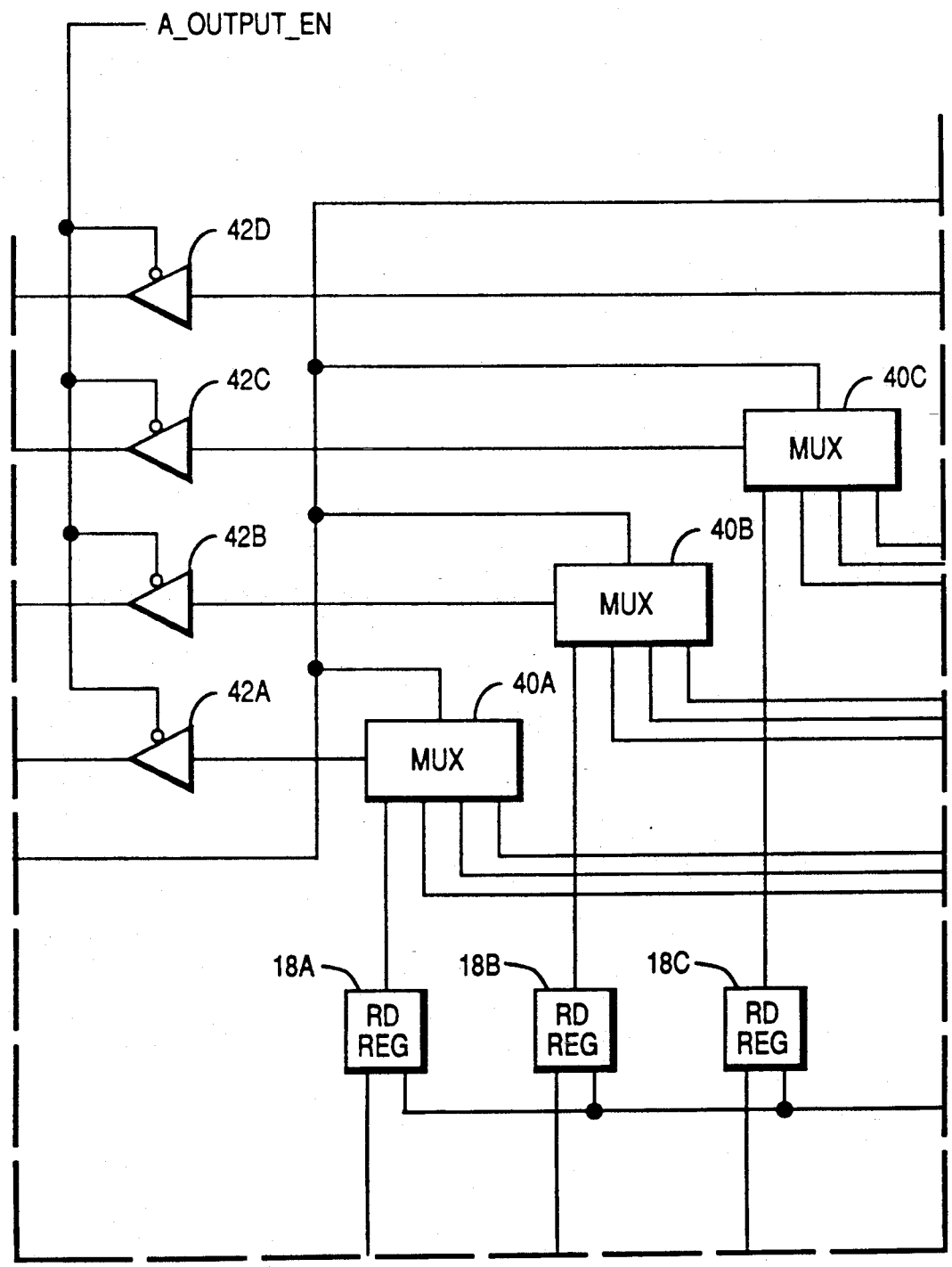
Figure 3E:
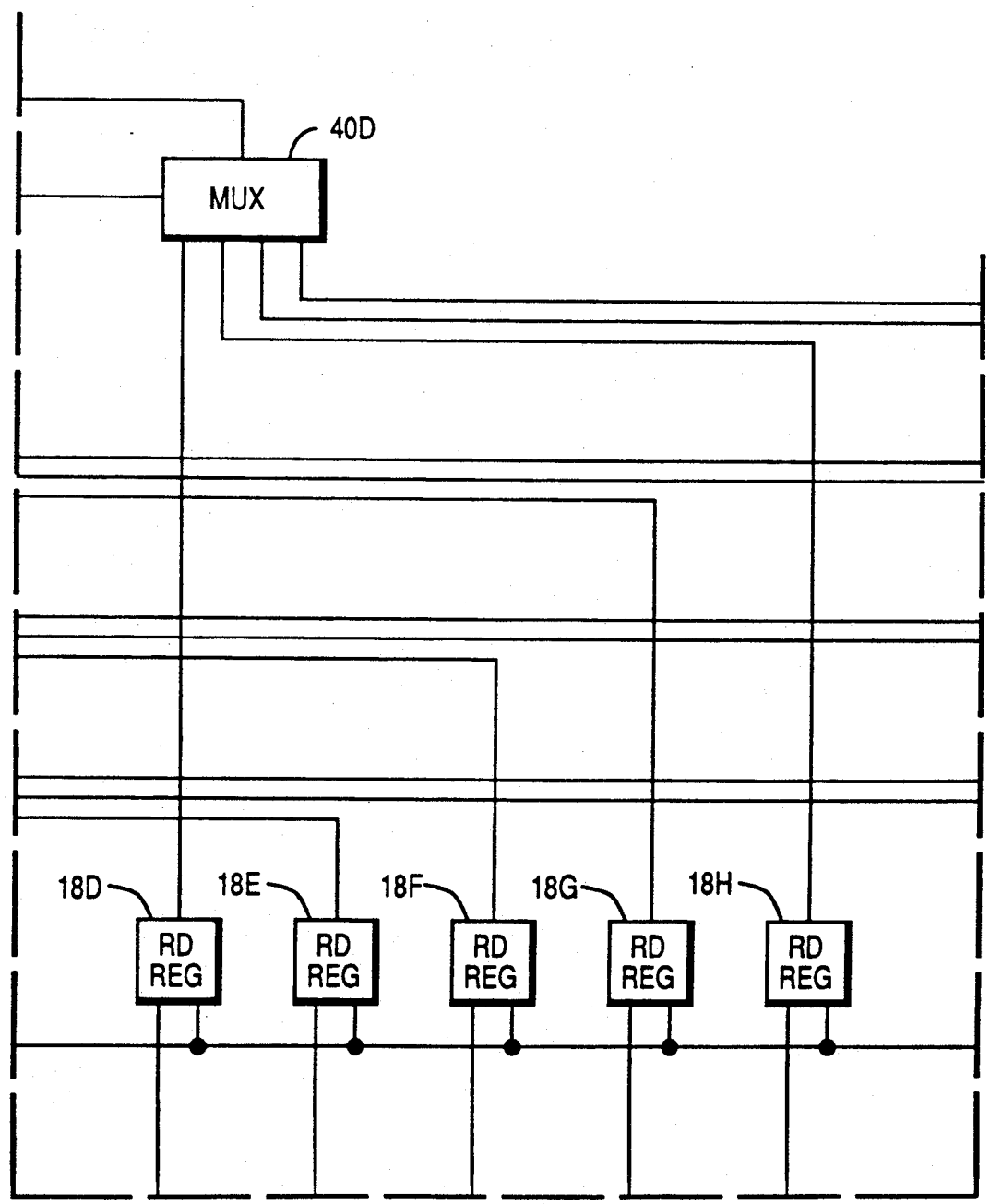
Figure 3F:
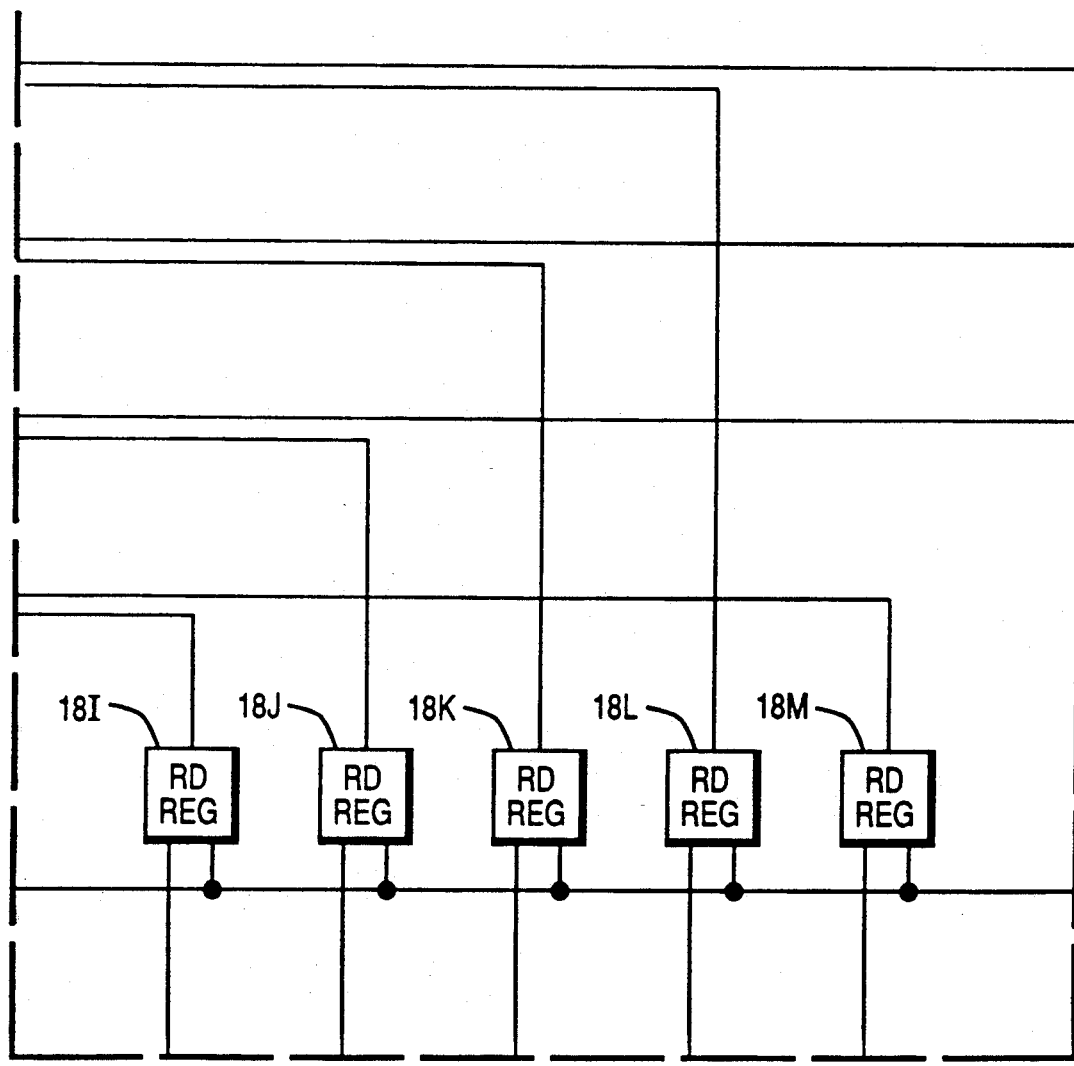
Figure 3G:
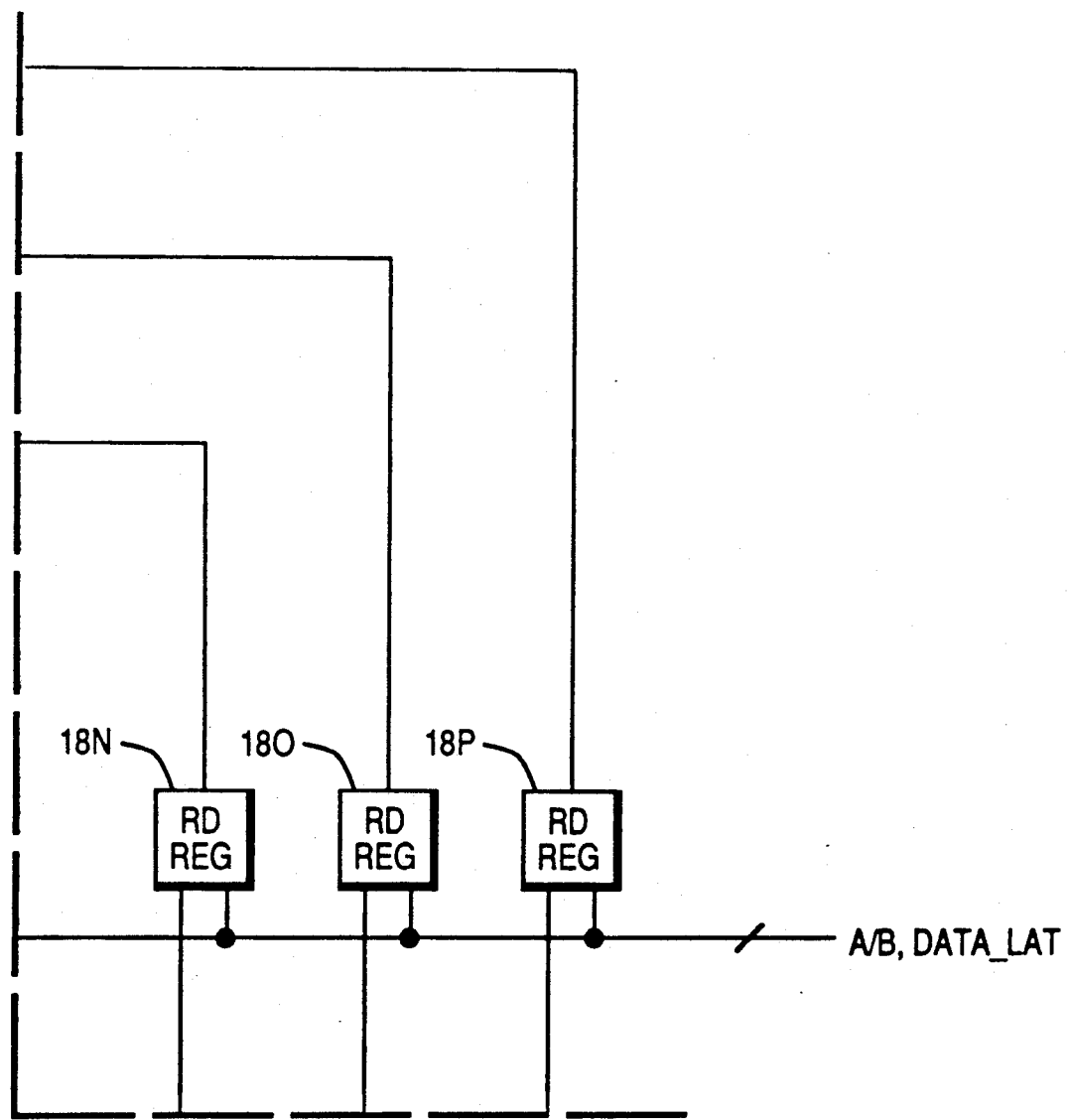
Figure 3H:
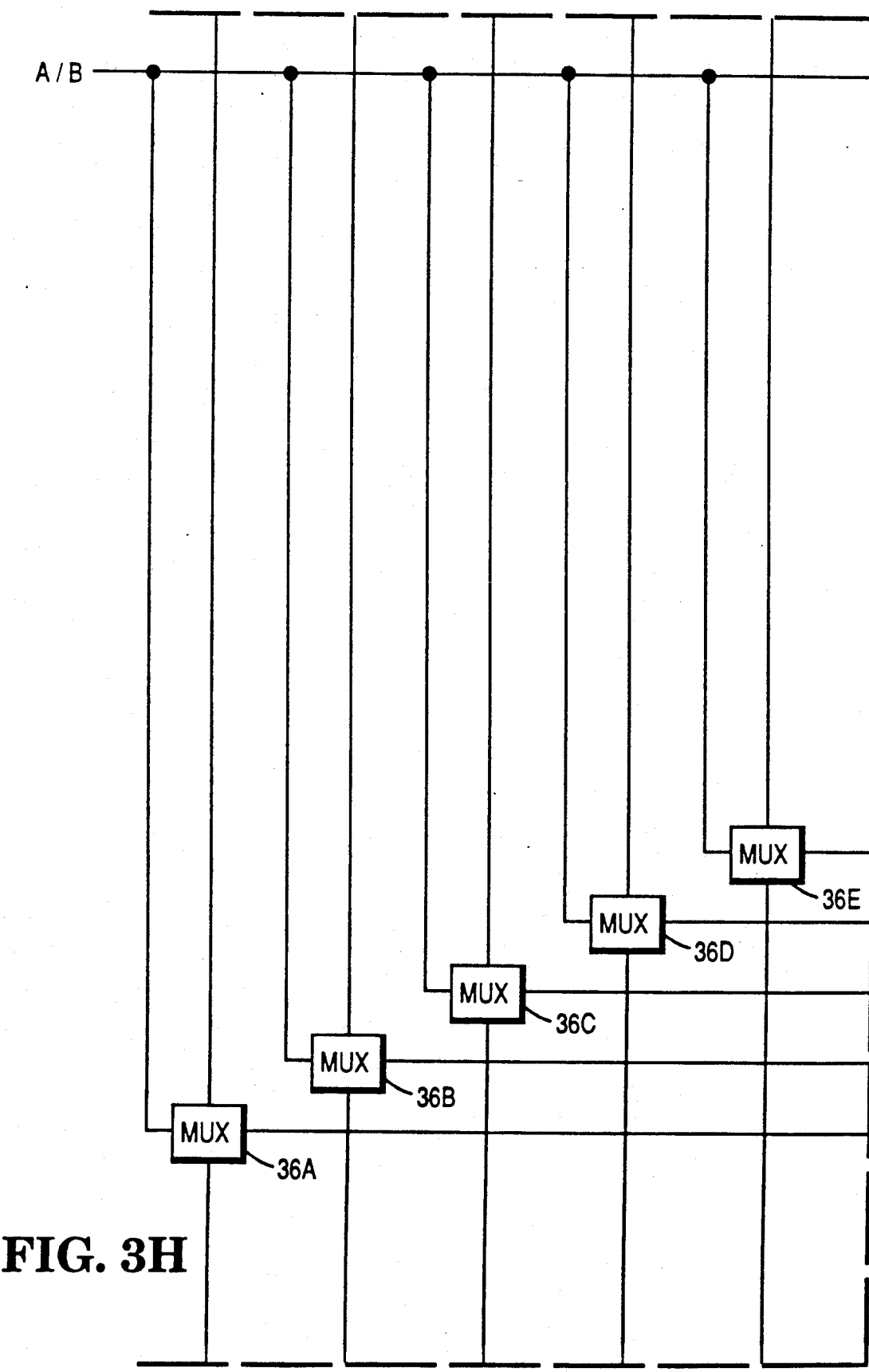
Figure 3I:
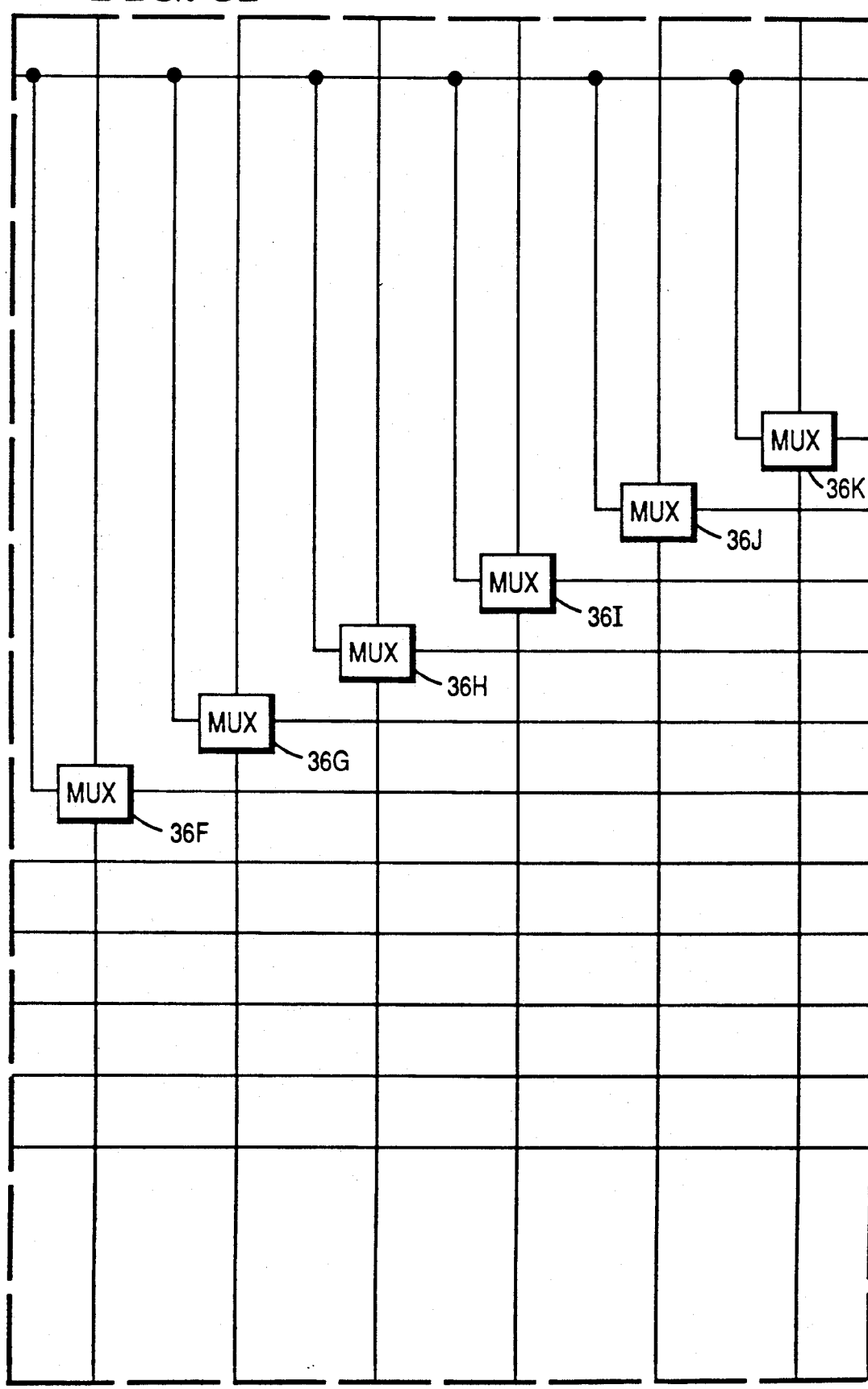
Figure 3J:
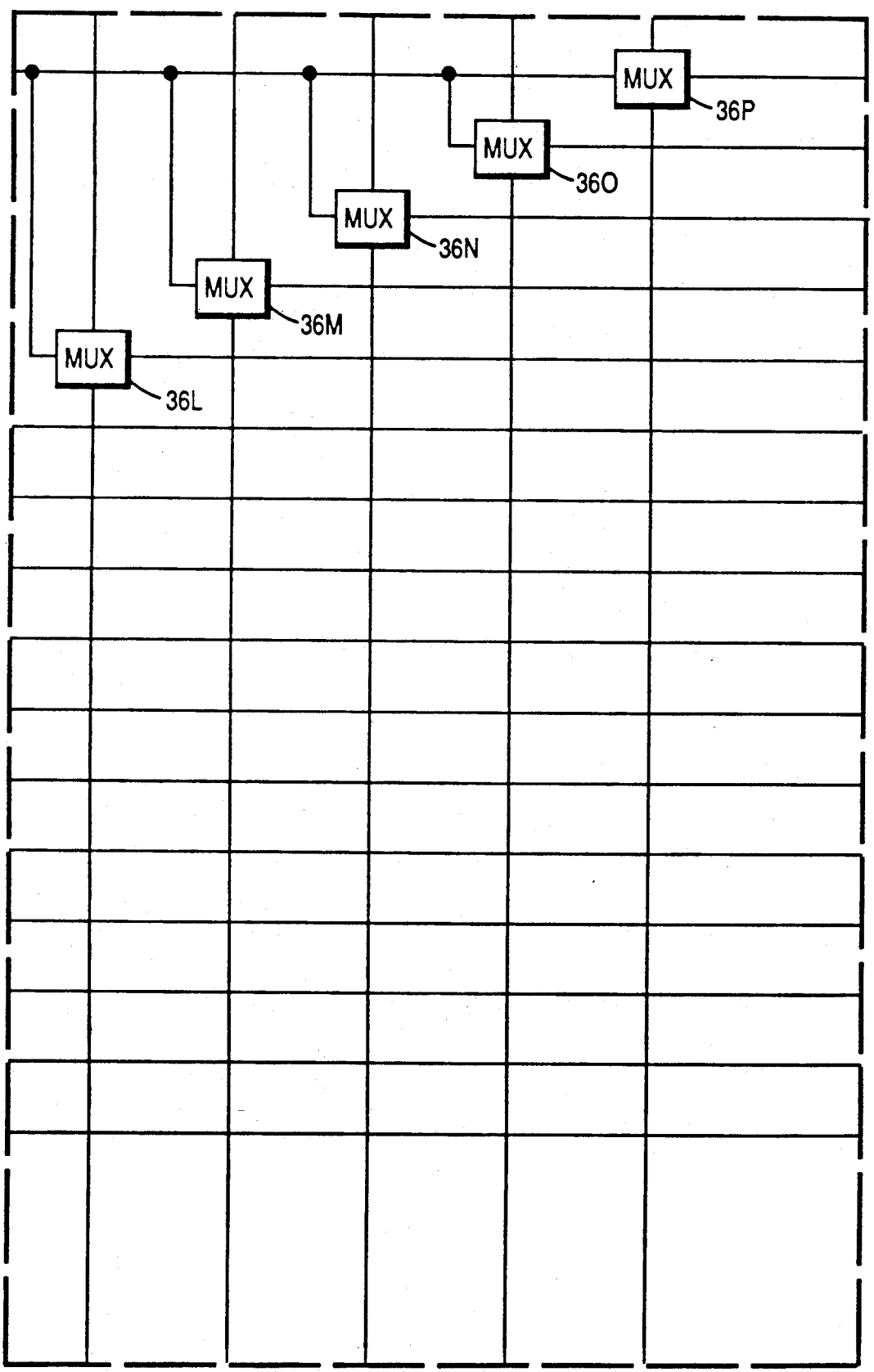
Figure 3K:
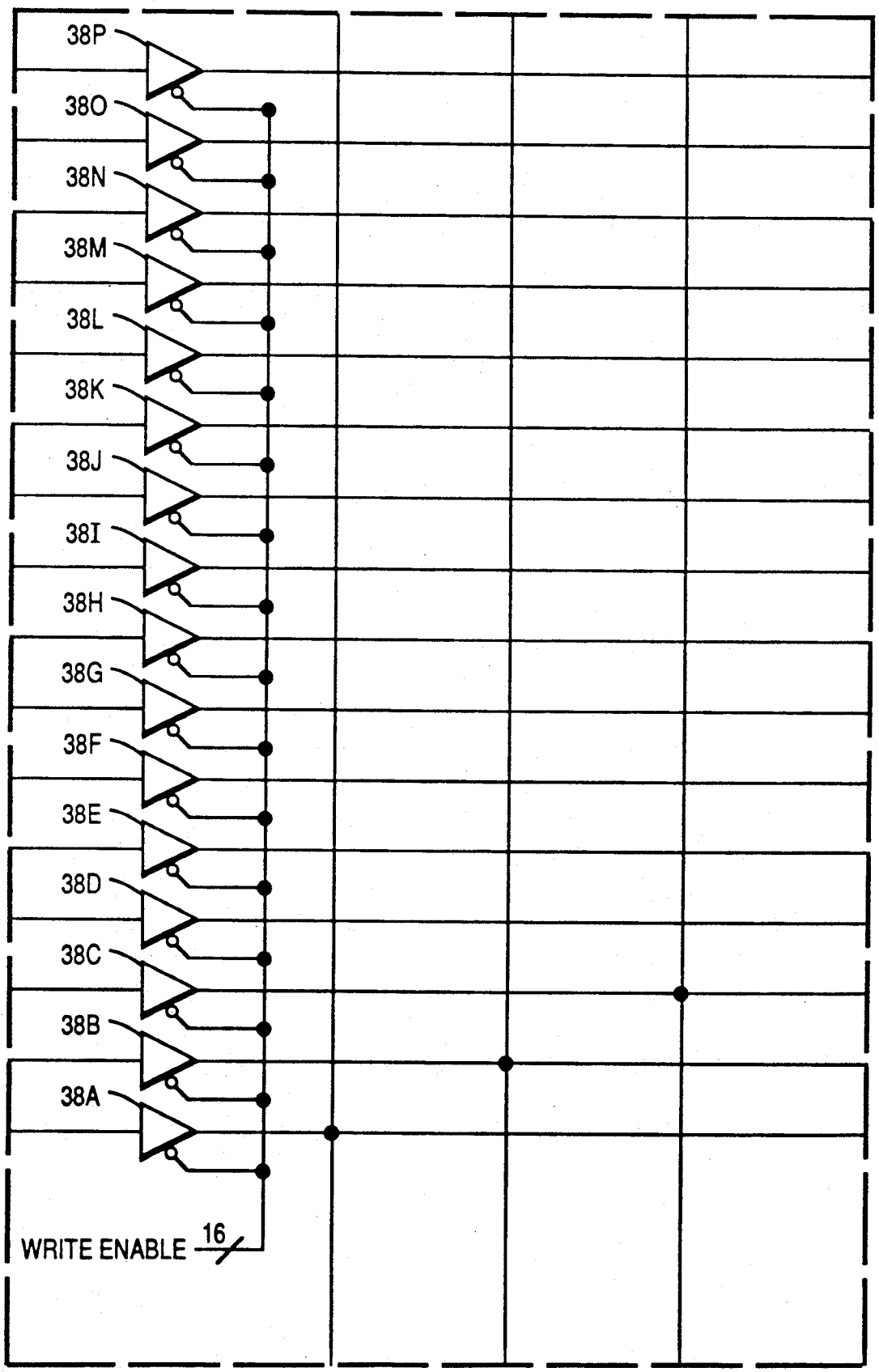
Figure 3L:
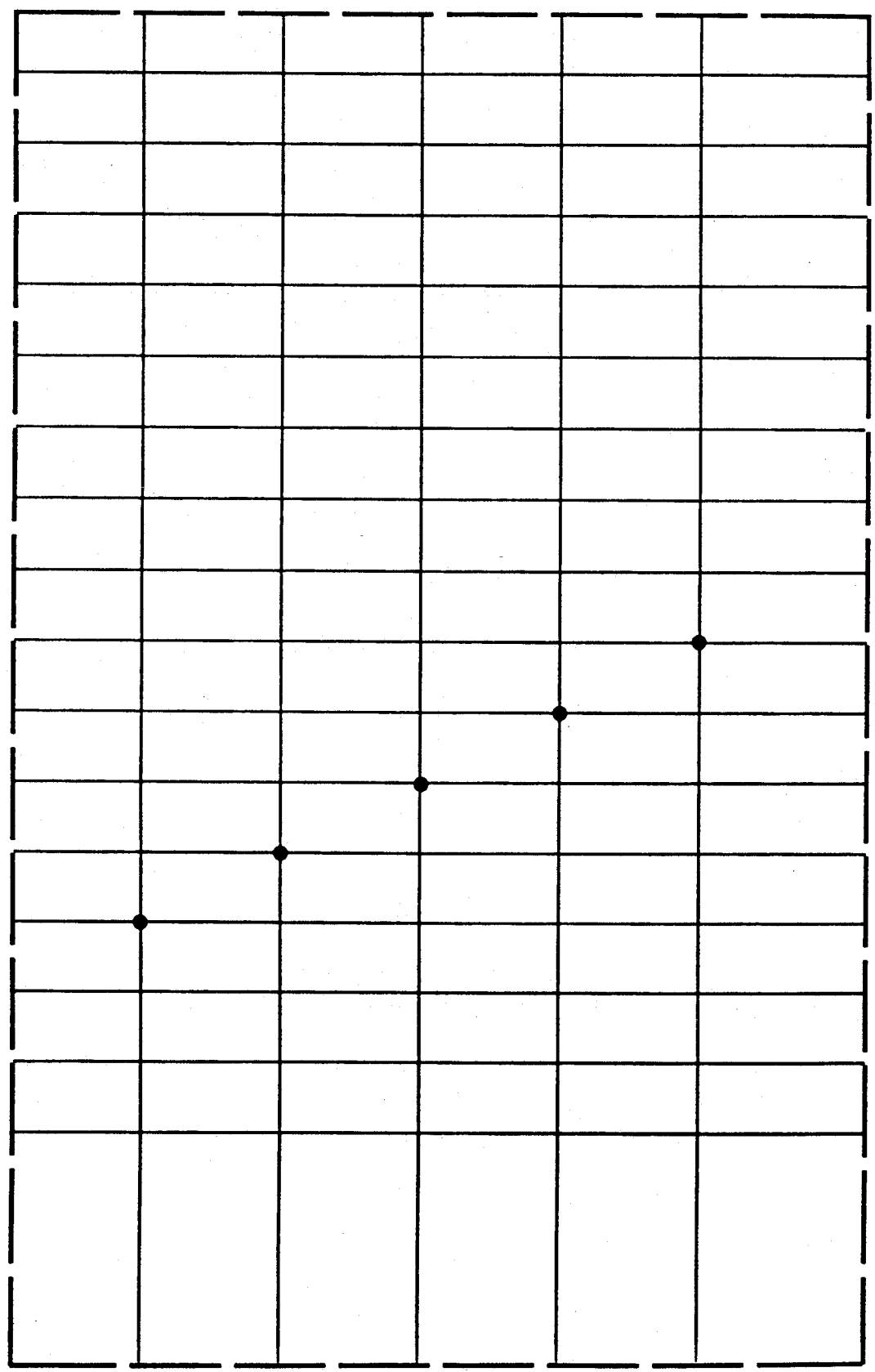
Figure 3M:
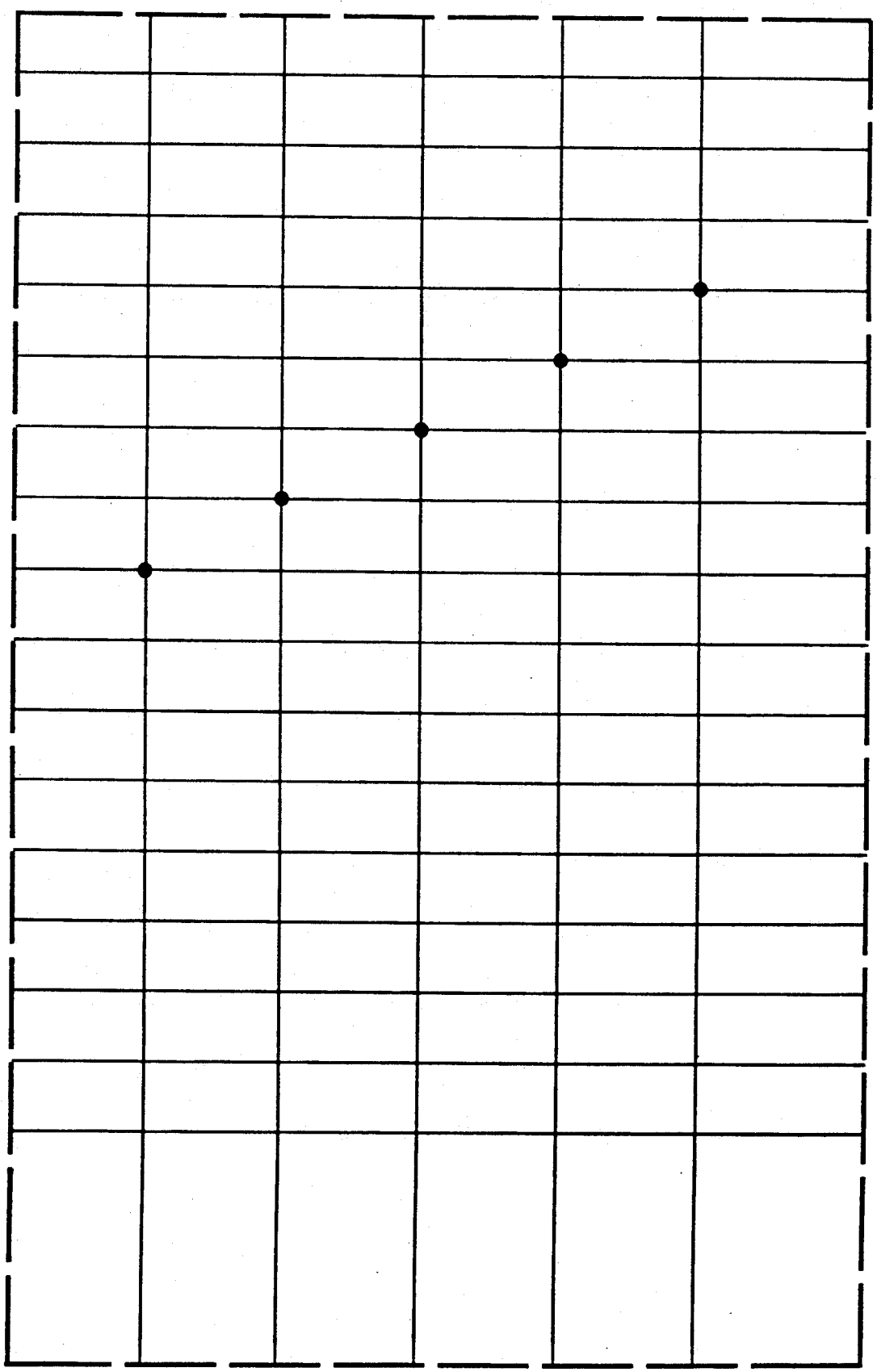
Figure 3N:
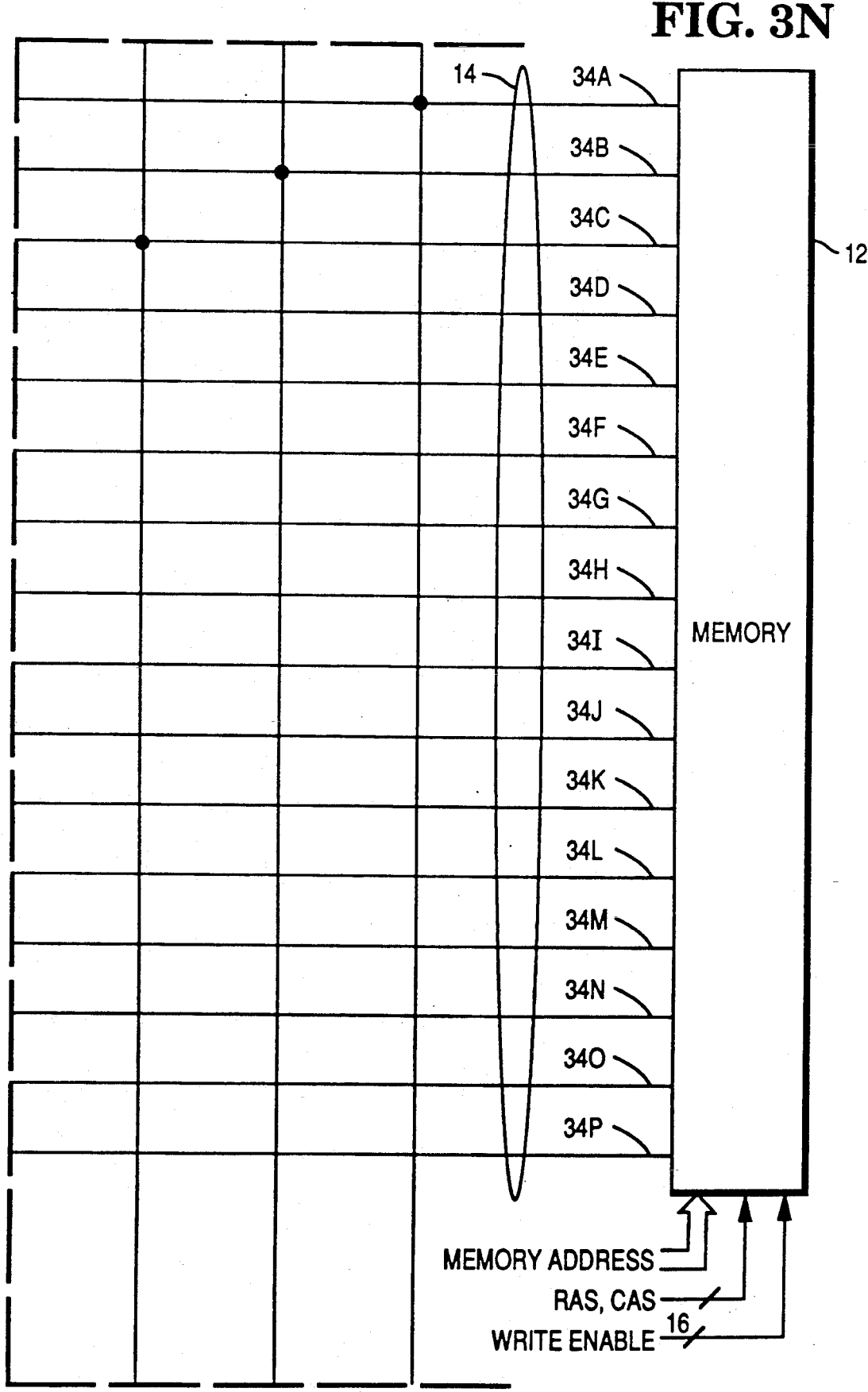
Figure 30:
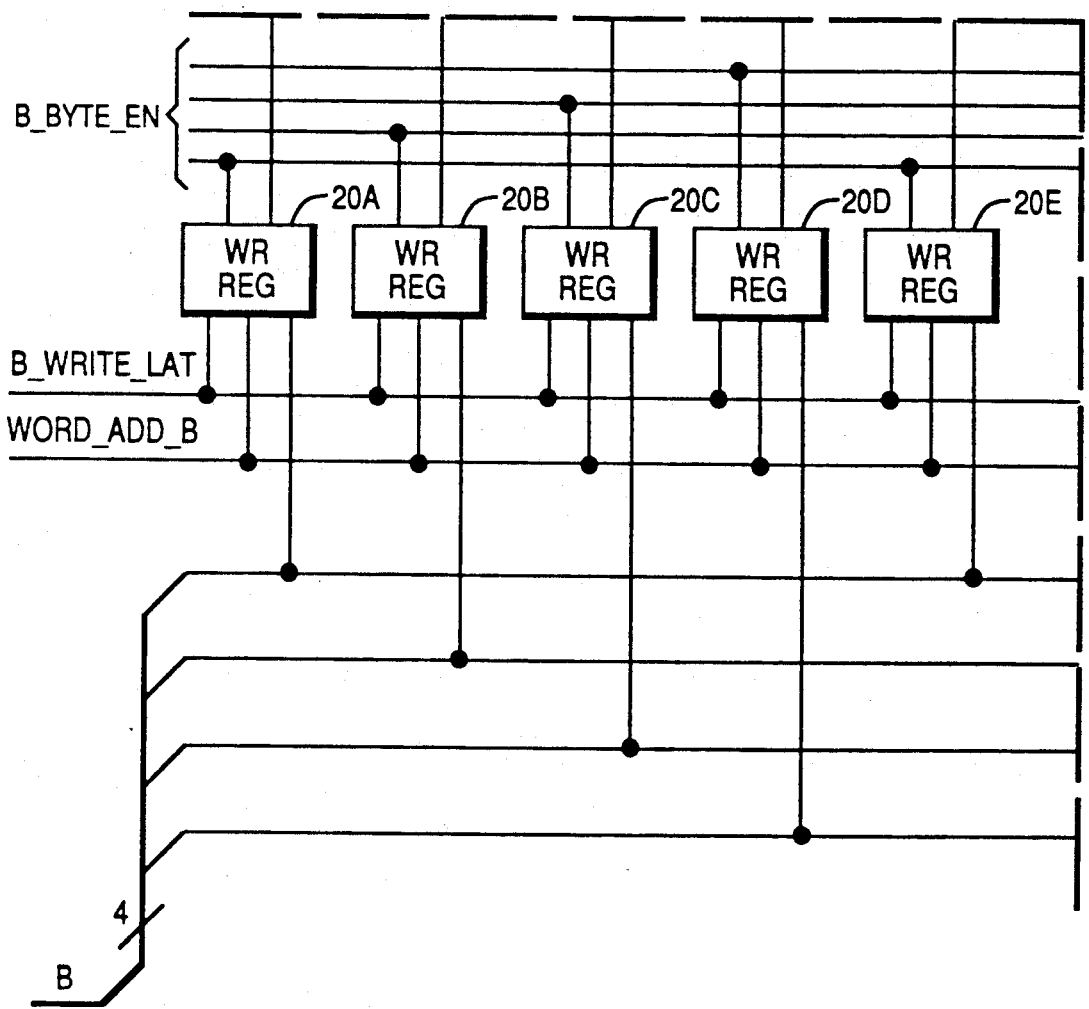
Figure 3P:
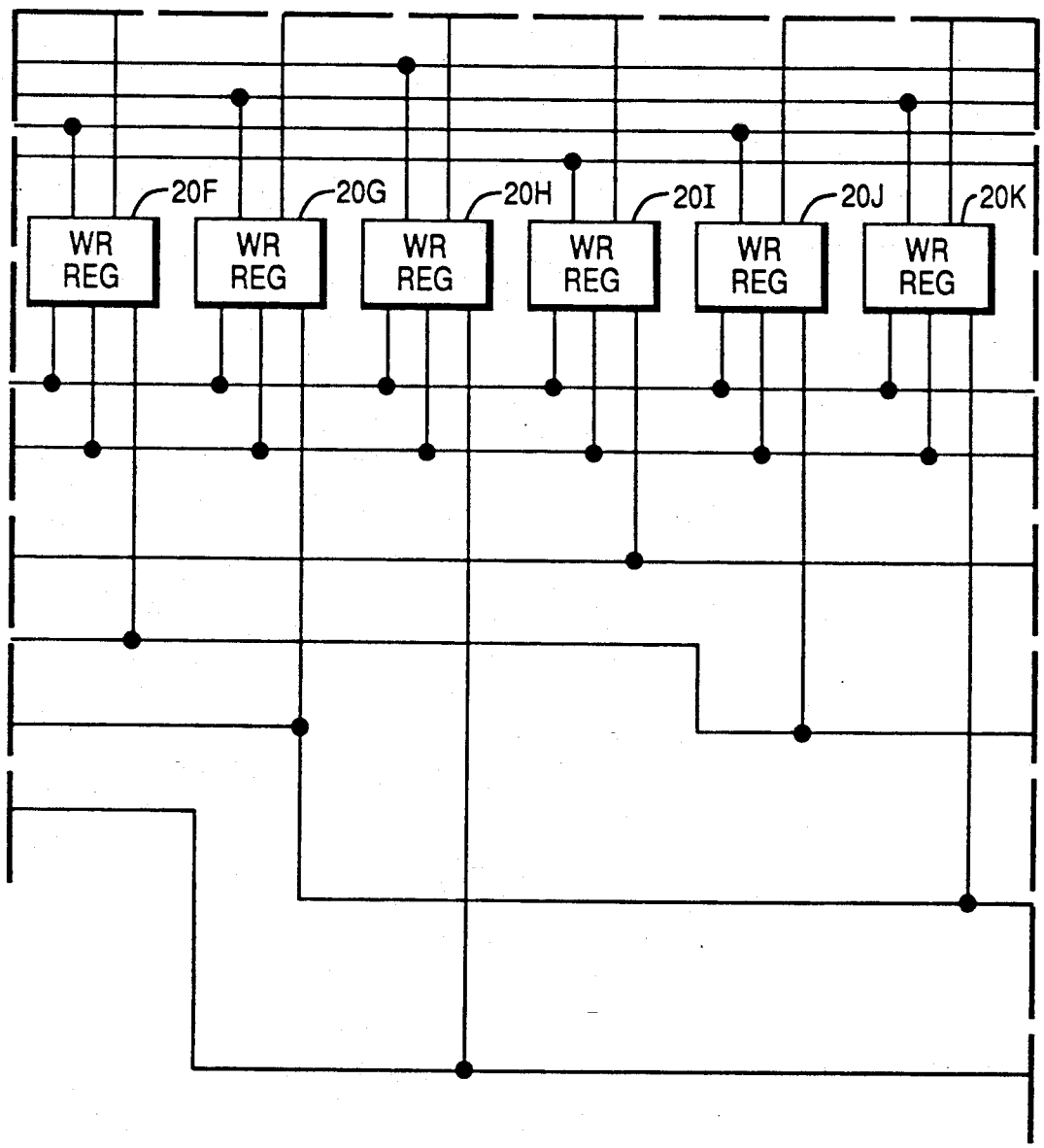
Figure 3Q:
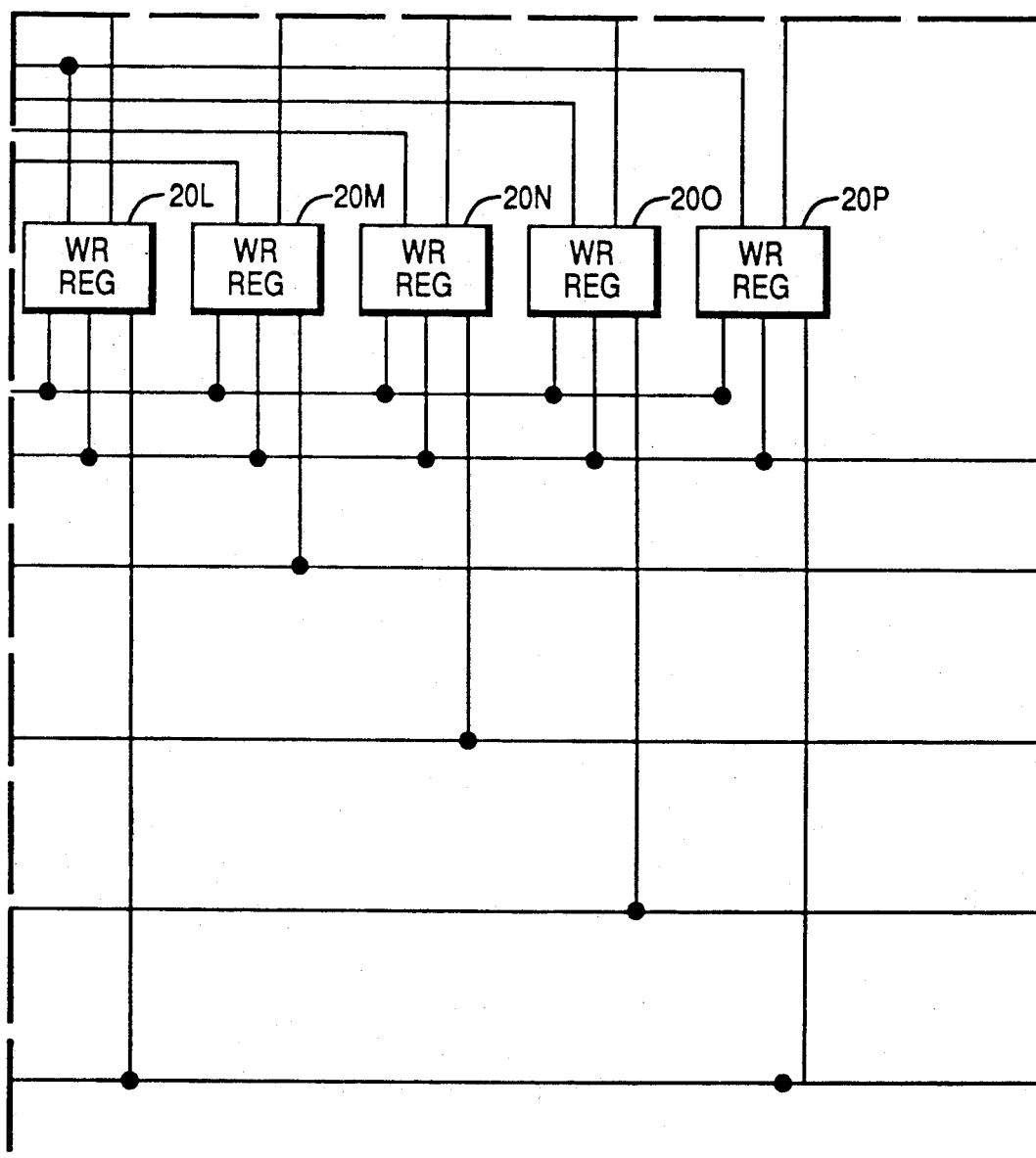
Figure 3R:
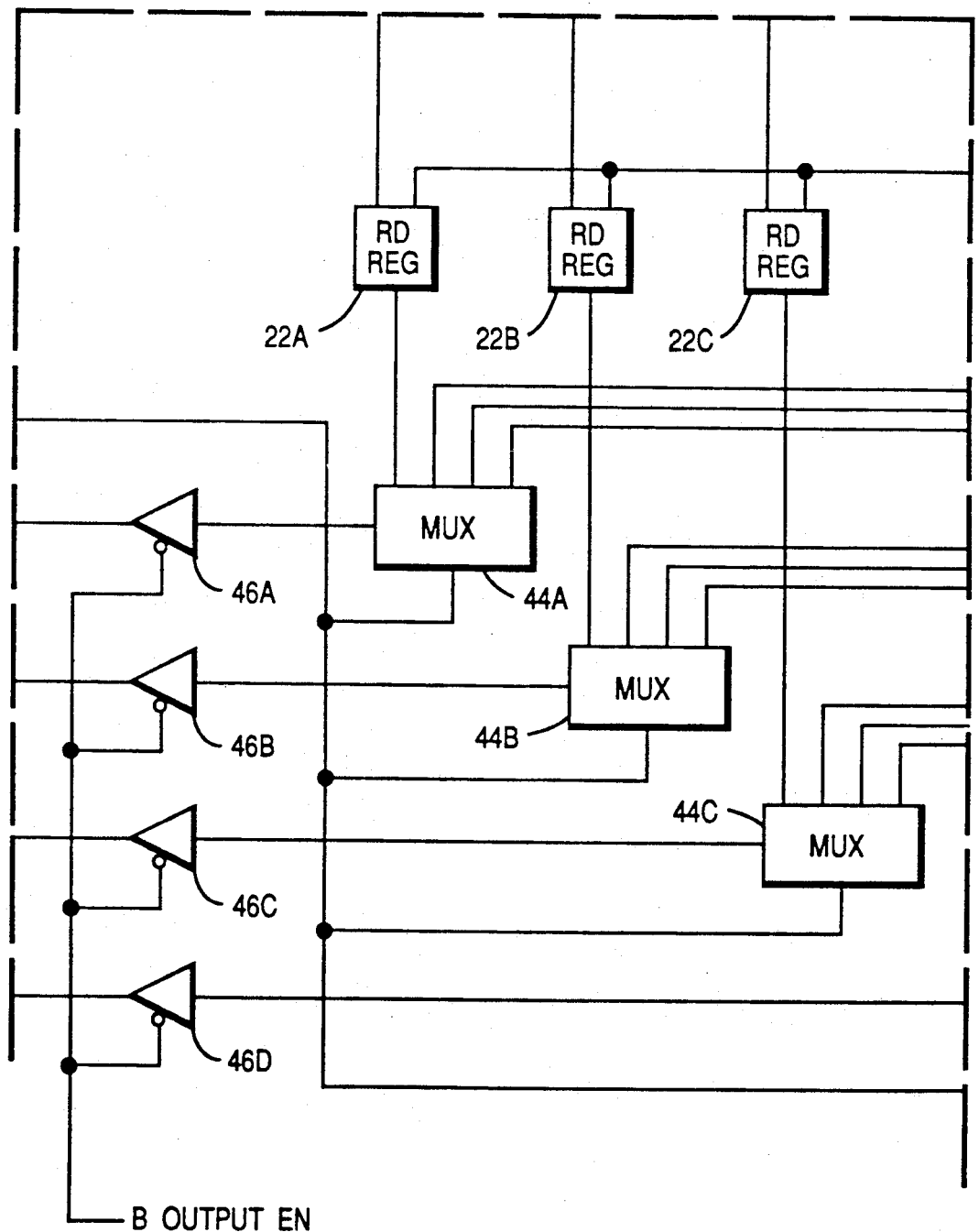
Figure 3S:
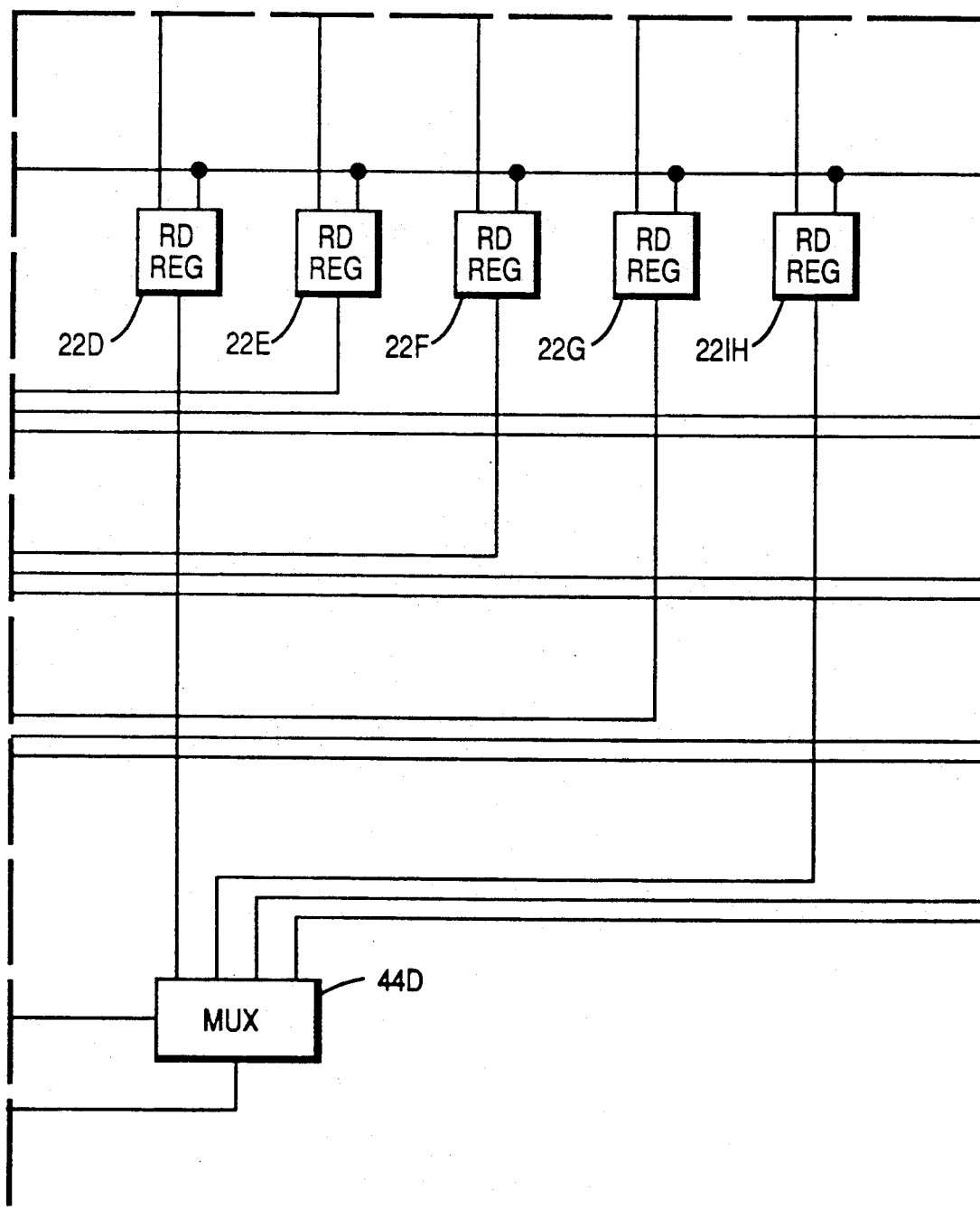
Figure 3T:
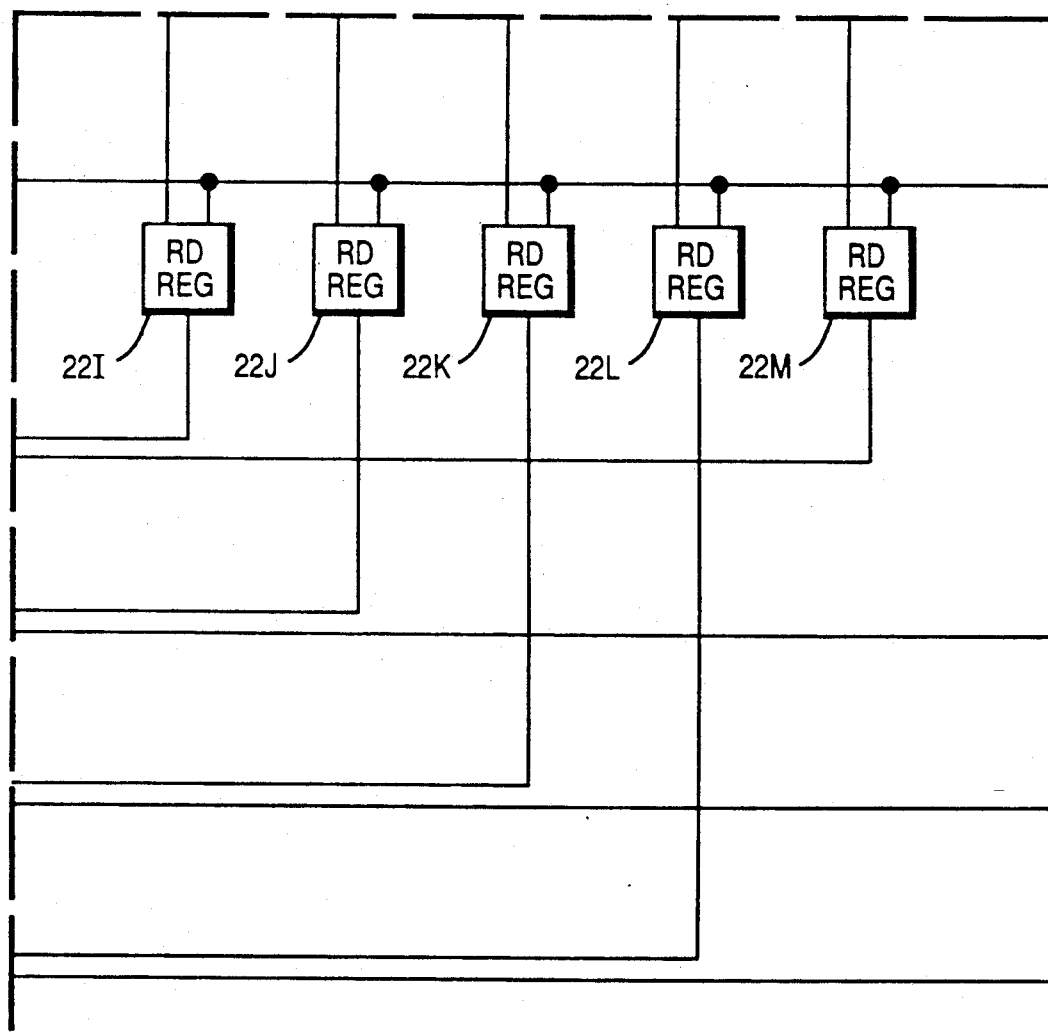
Figure 3U:
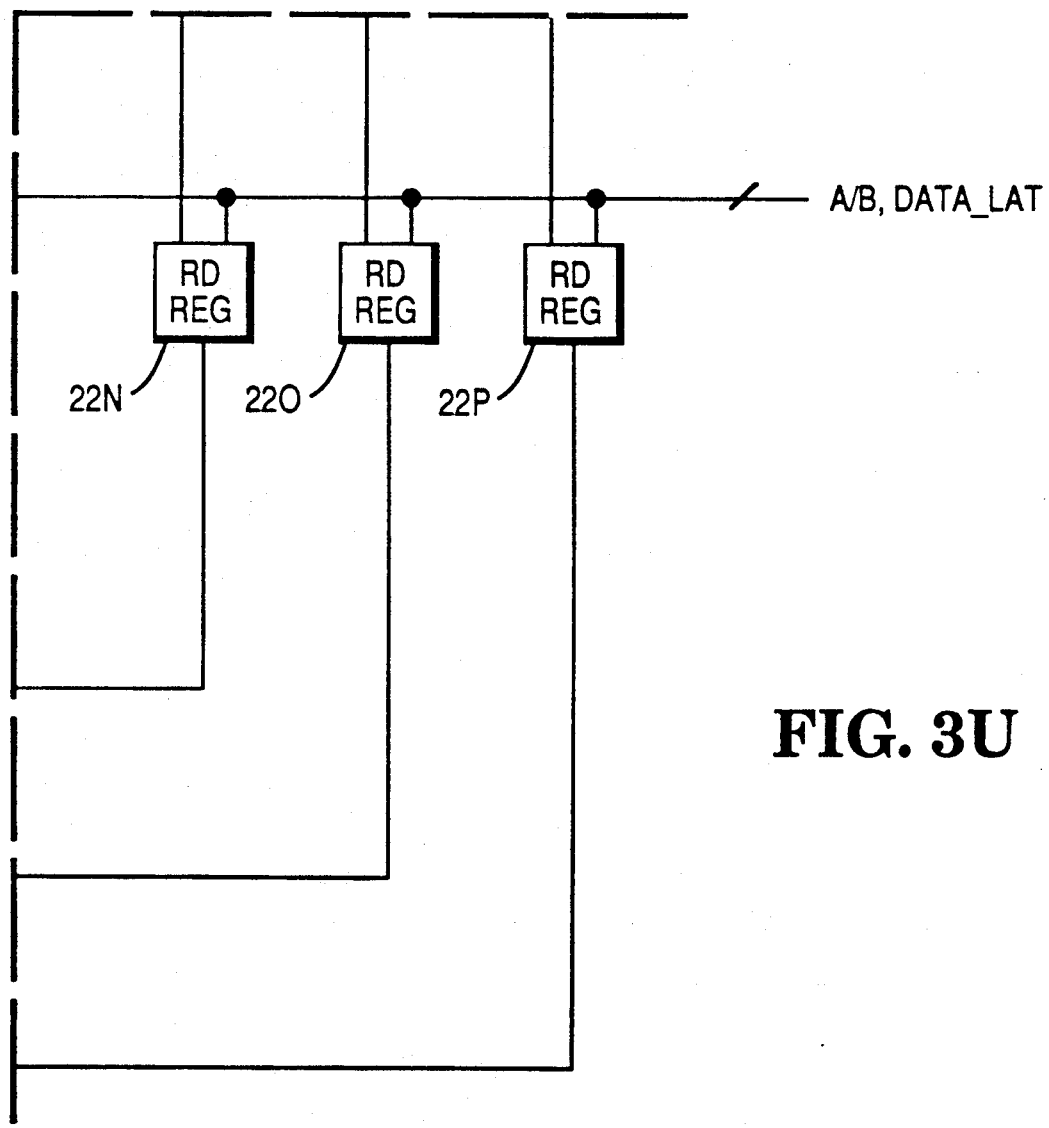

Reference is now made to FIGS. 3A-3U which are assembled according to the map on FIG. 3A. FIG. 3N shows memory 12 with a single port for bus 14 for the transfer of data into and out of memory 12. Each of the lines 34a, 34b, 34c, ..., 34p, comprising bus 14 carries a byte (eight bits) of data. The embodiment discloses 16 of such byte wide data lines. However, the invention is not limited to 16 byte lines, nor is it limited to eight bit data bytes. Each addressable location in memory 12 stores the same number of data bytes as the number of lines in bus 14. Memory 12 also receives MEMORY ADDRESS, WRITE ENABLE, RAS and CAS signals for the transfer of data into and out of memory 12.

Bus A is four bytes wide and is connected to memory 12 by write registers 16a, 16b, ..., 16p, and by read registers 18a, 18b, ..., 18p. Write registers 16a, 16b, ..., 16p, are connected in parallel with read registers 18a, 18b, ..., 18p. Bus B is also four bytes wide and is connected to memory 12 by write registers 20a, 20b, ..., 20p, and by read registers 22a, 22b, ..., 22p. Write registers 20a, 20b, ..., 20p, are connected in parallel with read registers 22a, 22b, ..., 22p. According to the present invention, bus A and bus B each has a width of less than bus 14, but do not necessarily have the same bus width. Each of the various write and read registers are a single byte wide.

Each write register 16a, 16b, ..., 16p, and each write register 20a, 20b, ..., 20p, is connected to memory 12 through a multiplexer 36a, 36b, ..., 36p, respectively. Referring to FIGS. 3A-3C, each write register 16a, 16b, ..., 16p, is connected to an address line for receiving a word address WORD_ADD_A signal, to a line for receiving a timing A_WRITE_LAT signal, and to one of the control lines for receiving enable A_BYTE_EN signals. Every fourth write register, e.g. 16a, 16e, 16i, and 16m, is connected to one of the A_BYTE_EN signal lines, with exactly four of the write registers connected to each line. Referring to FIGS. 3O-3Q, each write register 20a, 20b, ..., 20p, is connected to an address line for receiving a word address WORD_ADD_B signal, to a line for receiving a timing B_WRITE_LAT signal, and to one of the control lines for receiving enable B_BYTE_EN signals. Every fourth write register, e.g. 20a, 20e, 20i, and 20m, is connected to one of the B_BYTE_EN signal lines, with exactly four of the write registers connected to each line.

Each write register 16a, 16b, ..., 16p, may include a respective flag register (not shown) to generate a WRITE HISTORY A signal each time a data byte is written into the respective write register. Similarly, each write register 20a, 20b, ..., 20p, may include a respective flag register (not shown) to generate a WRITE HISTORY B signal each time a data byte is written into the respective write register. Each multiplexer 36a, 36b, ..., 36p, is also connected to a control line for receiving a control signal A/B for enabling the transfer of data bytes from registers 16a, 16b, ..., 16p, or registers 20a, 20b, ..., 20p, to memory 12. Each multiplexer 36a, 36b, ..., 36p, is connected to memory 12 through a tristate device 38a, 38b, ..., 38p, respectively. Each tristate device receives a WRITE ENABLE signal which deactivates the devices for a read operation and selectively enables the devices for a write operation.

Figure 4:
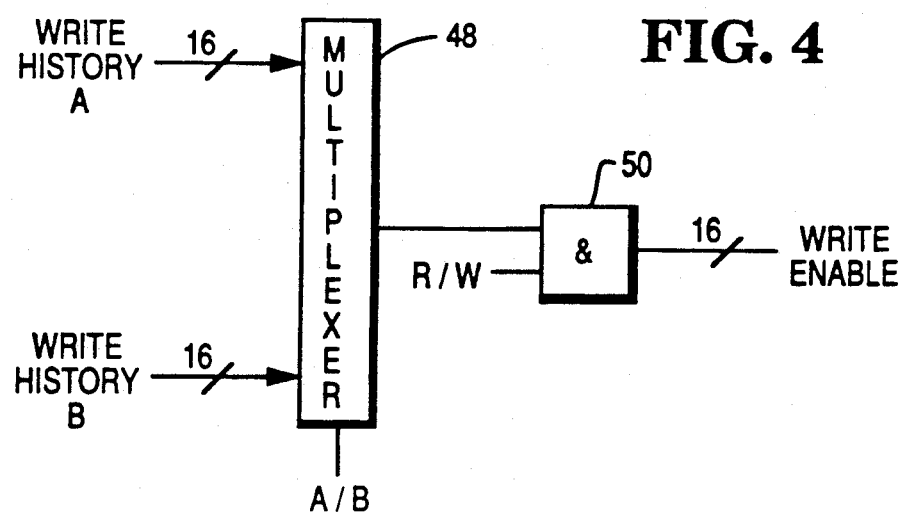
FIG. 4 is a circuit for generating WRITE ENABLE signals.

The generation of the WRITE ENABLE signals is shown in FIG. 4. A multiplexer 48 has inputs for receiving WRITE HISTORY A signals and WRITE HISTORY B signals and a control input A/B for selecting between the signals. The output of multiplexer 48 is connected to one input of an AND gate 50. The other input of AND gate 50 receives the R/W signal, and the output of AND gate 50 are the WRITE ENABLE signals provided to tristate devices 38a, 38b, ..., 38p. In this manner, only those write registers having a data byte will be connected to memory 12.

Read registers 18a, 18b, ..., 18p, (FIGS. 3D-3G) are connected to a control line for receiving an enable A/B signal and a clock DATA_LAT signal. Read registers 22a, 22b, ..., 22p, (FIGS. 3R-3U) are connected to a control line for receiving an enable A/B signal and a clock DATA_LAT signal. Read registers 18a, 18b, ..., 18p, respond to one level of the A/B signal and registers 22a, 22b, ..., 22p, respond to its complement so that only registers 18a, 18b, ..., 18p, or 22a, 22b, ..., 22p, are enabled at a time.

Referring to FIGS. 3D-3E, multiplexers 40a, 40b, 40c and 40d are connected between the output of selected read registers 18a, 18b, ..., 18p, and bus A. Each multiplexer 40a, 40b, 40c and 40d is connected to four read registers. For example, multiplexer 40a is connected to the output of read registers 18a, 18e, 18i and 18m. Each multiplexer 40a, 40b, 40c and 40d is connected to an address line for receiving the word address WORD_ADD_A signal. The output of each multiplexer 40a, 40b, 40c and 40d is connected to bus A through tristate device 42a, 42b, 42c and 42d, respectively. Each tristate device is connected to a control line for receiving an enable A_OUTPUT_EN signal for transferring data bytes from predetermined ones of the read registers 18a, 18b, ..., 18p.

Similarly, referring to FIGS. 3R-3S, multiplexers 44a, 44b, 44c and 44d are connected between the output of selected read registers 22a, 22b, ..., 22p, and bus B. Each multiplexer 44a, 44b, 44c and 44d is connected to four read registers. For example, multiplexer 44a is connected to the output of read registers 22a, 22e, 22i and 22m. Each multiplexer 44a, 44b, 44c and 44d is connected to an address line for receiving the word address WORD_ADD_B signal. The output of each multiplexer 44a, 44b, 44c and 44d is connected to bus B through tristate device 46a, 46b, 46c and 46d, respectively. Each tristate device is connected to a control line for receiving an enable B_OUTPUT_EN signal for transferring data bytes from predetermined ones of the read registers 22a, 22b, ..., 22p.

In operation, both data busses A and B may be active at the same time. Writes to memory 12 from bus A are started by filling write registers 16a, 16b, 16p. Four data bytes may be simultaneously transferred from bus A. If bus A is transferring sixteen consecutive data bytes to an addressable location in memory 12, all four A_BYTE_EN signals will be activated. In addition, the address bits of the first four-byte data word will enable write registers 16a, 16b, 16c and 16d. The timing signal A_WRITE_LAT will then clock the first four data bytes from bus A into write registers 16a, 16b, 16c and 16d, respectively. The next four data bytes will be transferred into registers 16e, 16f, 16g and 16h, respectively, and so forth until all write registers 16a, 16b, ..., 16p, are filled. The sixteen data bytes in registers 16a, 16b, ..., 16p, may be transferred to memory 12 by selecting the A registers with the A/B signal to multiplexers 36a, 36b, ..., 36p, and enabling tristate devices 38a, 38b, ..., 38p, with the WRITE ENABLE signals. If less than a full sixteen data bytes are to be transferred to memory 12 from bus A, tristate devices 38a, 38b, ..., 38p, will be selectively enabled. At the same time only those locations in memory 12 to receive a data byte will receive a WRITE ENABLE signal. The sixteen bytes are stored in memory 12 by receipt of MEMORY ADDRESS, RAS, CAS and WRITE ENABLE signals.

Similarly, writes to memory 12 from bus B are started by filling write registers 20a, 20b, ..., 20p. Four data bytes may be simultaneously transferred from bus B. If bus B is transferring sixteen consecutive data bytes to an addressable location in memory 12, all four B_BYTE_EN signals will be activated. In addition, the address bits of the first four-byte data word will enable write registers 20a, 20b, 20c and 20d. The timing signal B_WRITE_LAT will then clock the first four data bytes from bus B into write registers 20a, 20b, 20c and 20d, respectively. The next four data bytes will be transferred into registers 20e, 20f, 20g and 20h, respectively, and so forth until all write registers 20a, 20b, ..., 20p, are filled. The sixteen data bytes in registers 20a, 20b, ..., 20p, may be transferred to memory 12 by selecting the B registers with the A/B signal to multiplexers 36a, 36b, ..., 36p, and enabling tristate devices 38a, 38b, ..., 38p, with the WRITE ENABLE signals. If less than a full sixteen data bytes are to be transferred to memory 12 from bus B, tristate devices 38a, 38b, ..., 38p, will be selectively enabled. At the same time only those locations in memory 12 to receive a data byte will receive a WRITE ENABLE signal.

It should be clear that data bytes may be transferred from busses A and B to write registers 16 and 20 simultaneously. Alternatively, bus A can read registers 18a, 18b, ..., 18p, and/or bus B can read registers 22a, 22b, ..., 22p. For example, if an addressable location in memory 12 is to be read by bus A, tristate devices 38a, 38b, ..., 38p, are placed in a tristate mode by the WRITE ENABLE signal, read registers 18a, 18b, ..., 18p, are selected with the A/B signal and then filled upon receipt of the DATA_LAT clock signal. Four consecutive data bytes for transfer from registers 18 to bus A can be selected by the WORD_ADD_A signal provided to multiplexers 40a, 40b, 40c and 40d. The WORD_ADD_A signal selects a predetermined four byte word within the sixteen bytes held in read registers 18a, 18b, 18p. The four selected data bytes are transferred to bus A by enabling tristate devices 42a, 42b, 42c and 42d with the A_OUTPUT_EN signal.

Similarly, if an addressable location in memory 12 is to be read by bus B, tristate devices 38a, 38b, ..., 38p, are placed in a tristate mode by the WRITE ENABLE signal, read registers 22a, 22b, ..., 22p, are selected with the A/B signal and then filled upon receipt of the DATA_LAT clock signal. Four consecutive data bytes for transfer from registers 18 to bus B can be selected by the WORD_ADD_B signal provided to multiplexers 44a, 44b, 44c and 44d. The WORD_ADD_B signal selects a predetermined four byte word within the sixteen bytes held in read registers 22a, 22b, ..., 22p. The four selected data bytes are transferred to bus B by enabling tristate devices 46a, 46b, 46c and 46d with the B_OUTPUT_EN signal.

Data registers 18a, 18b, ..., 18p, are always completely filled for a read from bus A. Similarly, data registers 22a, 22b, ..., 22p, are always filled for a read from bus B. In this manner, if the next read from either bus is for a sequential data byte, the respective read registers 18a, 18b, ..., 18p, or 22a, 22b, ..., 22p, can be read without another access to memory 12 and without interfering with a memory access from the other bus.

It will be clear to those skilled in the art that the present invention is not limited to the specific embodiment disclosed and illustrated herein. Numerous modifications, variations, and full and partial equivalents can be undertaken without departing from the invention as limited only by the spirit and scope of the appended claims.

What is desired to be secured by Letters Patent of the United States is as follows.

What is claimed is:

1. A dual port memory system comprising:
a memory for storing m data bytes at each addressable location therein;
an n byte wide first data bus and a p byte wide second data bus, wherein $n<m$ and $p<m$;
m, byte wide, parallel, first write registers connected between said first bus and said memory;
m, byte wide, parallel, first read registers connected in parallel with said first write registers between said first bus and said memory;
m, byte wide, parallel, second write registers connected between said second bus and said memory; and
m, byte wide, parallel, second read registers connected in parallel with said write registers between said second bus and said memory.

2. The system of claim 1 further comprising:
first and second address lines, n first control lines, and p second control lines;
wherein every first write register is connected to said first address line, each first register is connected to one of said first control lines with an equal number of said first write registers being connected to each first control line, every second write register is connected to said second address line, and each second write register is connected to one of said second control lines with an equal number of said second write registers being connected to each second control line.

3. The system of claim 2 wherein said address lines and control lines provide signals which selectively enable said write registers to receive one or more data bytes from the connected bus.

4. The system of claim 1 further comprising:
m multiplexers connected between said memory and first and second write registers;
wherein said multiplexers are responsive to control signals for selectively enabling the transfer of up to m data bytes from said first or second write registers into said memory.

5. The system of claim 1 further comprising:
first and second control lines;
wherein every first read register is connected to said first control line and every second read register is connected to said second control line; and
wherein said first and second control lines provide complementary enable signals, respectively, and a clock signal.

6. The system of claim 5 wherein said first or second read registers respond to said enable and clock signals to receive m data bytes from said memory.

7. The system of claim 1 further comprising:
n first multiplexers and p second multiplexers connected between said first and second read registers and first and second busses, respectively;
wherein each first read register is connected to one of said first multiplexers with an equal number of said first read registers being connected to each of said first multiplexers; and
wherein each second read register is connected to one of said second multiplexers with an equal number of said second read registers being connected to each of said second multiplexers.

8. The system of claim 7 further comprising:
first and second address lines;
wherein each of said first multiplexers is connected to said first address line and each of said second multiplexers is connected to said second address line; and
wherein said address lines provide signals to said multiplexers to transfer predetermined data bytes from said read registers to said bus.

9. The system of claim 1 wherein $n=p$.

10. The system of claim 1 wherein n and p are integer factors of m.

11. A dual port memory system comprising:
a memory for storing m data bytes at each addressable location therein;
an n byte wide first data bus and a p byte wide second data bus, wherein $n<m$ and $p<m$;
m, byte wide, parallel, first write registers connected between said first bus and said memory;
m, byte wide, parallel, first read registers connected in parallel with said first write registers between said first bus and said memory;
m, byte wide, parallel, second write registers connected between said second bus and said memory;
m, byte wide, parallel, second read registers connected in parallel with said write registers between said second bus and said memory;
first and second address lines, n first control lines, and p second control lines;
m first multiplexers connected between said memory and first and second write registers;
third and fourth control lines; and
n second multiplexers and p third multiplexers connected between said first and second read registers and first and second busses, respectively;
wherein every first write register is connected to said first address line, each first register is connected to one of said first control lines with an equal number of said first write registers being connected to each first control line, every second write register is connected to said second address line, and each second write register is connected to one of said second control lines with an equal number of said second write registers being connected to each second control line;
wherein said first multiplexers are responsive to control signals for selectively enabling the transfer of up to m data bytes from said first or second write registers into said memory;
wherein every first read register is connected to said third control line and every second read register is connected to said fourth control line;
wherein said third and fourth control lines provide complementary enable signals, respectively, and a clock signal;
wherein each first read register is connected to one of said second multiplexers with an equal number of said first read registers being connected to each of said second multiplexers; and
wherein each second read register is connected to one of said third multiplexers with an equal number of said second read registers being connected to each of said third multiplexers.

12. A system comprising a memory for transferring m data bytes at a time, first and second busses each having a width of less than m data bytes, first parallel m byte wide read and write registers connected between said first bus and said memory, and second parallel m byte wide read and write registers connected between said second bus and said memory.

13. The system of claim 12 wherein data bytes are transferable between said first write or read registers and said first bus concurrently with the transfer of data bytes between said second write or read registers and said second bus.

* * * * *